US008867529B2

(12) United States Patent
Pearce

(10) Patent No.: US 8,867,529 B2
(45) Date of Patent: Oct. 21, 2014

(54) SYSTEM AND METHOD FOR PROVIDING A FATE SHARING IDENTIFIER IN A NETWORK ENVIRONMENT

(75) Inventor: Christopher E. Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 572 days.

(21) Appl. No.: 12/886,388

(22) Filed: Sep. 20, 2010

(65) Prior Publication Data

US 2012/0069837 A1    Mar. 22, 2012

(51) Int. Cl.
*H04L 12/66* (2006.01)

(52) U.S. Cl.
USPC ........... 370/352; 370/356; 370/329; 370/328; 379/219; 379/220

(58) Field of Classification Search
CPC ............... B29C 65/606; H04L 47/823; H04L 29/06027; H04L 29/06326; H04M 7/006
USPC ................... 370/352, 356, 329; 379/219, 220
See application file for complete search history.

(56) References Cited

U.S. PATENT DOCUMENTS

| 6,304,576 B1 | 10/2001 | Corley et al. |
| 6,513,108 B1 | 1/2003 | Kerr et al. |
| 6,598,077 B2 | 7/2003 | Primak et al. |
| 6,606,301 B1 | 8/2003 | Muller et al. |
| 6,628,649 B1 | 9/2003 | Raj et al. |
| 6,775,231 B1 | 8/2004 | Baker et al. |
| 6,788,646 B1 | 9/2004 | Fodor et al. |
| 6,856,601 B1 | 2/2005 | Bell et al. |
| 7,013,338 B1 * | 3/2006 | Nag et al. ...................... 709/226 |
| 7,035,202 B2 | 4/2006 | Callon |
| 7,106,756 B1 | 9/2006 | Donovan et al. |
| 7,143,168 B1 | 11/2006 | DiBiasio et al. |
| 7,281,043 B1 | 10/2007 | Davie |
| 7,453,801 B2 | 11/2008 | Taneja et al. |
| 7,492,886 B1 * | 2/2009 | Kalmanek et al. ....... 379/220.01 |
| 7,536,192 B2 | 5/2009 | O'Neill |
| 8,082,580 B1 * | 12/2011 | Desai et al. ...................... 726/14 |
| 8,204,223 B1 * | 6/2012 | Liebert et al. ................. 380/257 |
| 2002/0141345 A1 | 10/2002 | Szviatovszki et al. |
| 2003/0152029 A1 | 8/2003 | Couturier |
| 2003/0191828 A1 | 10/2003 | Ramanathan et al. |
| 2003/0223431 A1 | 12/2003 | Chavez et al. |
| 2004/0037397 A1 * | 2/2004 | Roby ......................... 379/88.01 |
| 2004/0081104 A1 | 4/2004 | Pan et al. |
| 2004/0083287 A1 | 4/2004 | Gao et al. |
| 2004/0156313 A1 | 8/2004 | Hofmeister et al. |

(Continued)

OTHER PUBLICATIONS

Braden, R. et al., "Resource Reservation Protocol (RSVP)—Version 1, Functional Specification," Network Working Group RFC 2205, Sep. 1997, 113 pages; http://tools.ietf.org/pdf/rfc2205.pdf.

(Continued)

*Primary Examiner* — Khaled Kassim

(57) ABSTRACT

A method is provided in one example embodiment and includes receiving a first portion of an identifier associated with a communication session involving a first endpoint that generated the first portion of the identifier. The method also includes receiving a second portion of the identifier associated with the communication session involving a second endpoint that generated the second portion of the identifier. The method can further include communicating a reservation request associated with a network resource to be allocated for the communication session. The reservation request includes the first portion and the second portion of the identifier.

17 Claims, 20 Drawing Sheets

(56) References Cited

U.S. PATENT DOCUMENTS

| | | | |
|---|---|---|---|
| 2005/0078688 A1 | 4/2005 | Sharma et al. | |
| 2005/0117512 A1 | 6/2005 | Vasseur et al. | |
| 2006/0045132 A1 | 3/2006 | Metke | |
| 2006/0056291 A1 | 3/2006 | Baker et al. | |
| 2006/0089988 A1 | 4/2006 | Davie et al. | |
| 2006/0259641 A1* | 11/2006 | Kim et al. | 709/245 |
| 2008/0046728 A1* | 2/2008 | Lyle | 713/169 |
| 2008/0195719 A1* | 8/2008 | Wu et al. | 709/213 |
| 2010/0135490 A1* | 6/2010 | Kwon et al. | 380/236 |
| 2011/0093722 A1* | 4/2011 | Devanand | 713/189 |
| 2012/0106463 A1* | 5/2012 | McBride et al. | 370/329 |

OTHER PUBLICATIONS

Braden, R. et al., "Resource ReSerVation Protocol (RSVP)—Version 1 Message Processing Rules," Network Working Group RFC 2209, Sep. 1997, 25 pages; http://www.rfc-editor.org/rfc/pdfrfc/rfc.2209.txt.pdf.

Handley, M. et al., "SIP: Session Initiation Protocol," Network Working Group RFC 2543, Mar. 1999, 153 pages; http://tools.ietf.org/pdf/rfc2543.pdf.

Herzog, S., "RSVP Extensions for Policy Control," Network Working Group 2750, Jan. 2000, 14 pages; http://tools.ietf.org/pdf/rfc2750.pdf.

Herzog, S., "Signaled Preemption Priority Policy Element," Network Working Group RFC 3181, Oct. 2001, 13 pages; http://tools.ietf.org/pdf/rfc3181.pdf.

Perlman; Radia, Interconnections Second Edition: Bridges, Routers, Switches, and Internetworking Protocols, Chapter 1, Section 1.1 entitled "Layers," Addison Wesley Professional Computing Series, ©Addison Wesley 1999, 9 pages.

Shenker, S. et al., "General Characterization Parameters for Integrated Service Network Elements," Network Working Group RFC 2215, Sep. 1997, 17 pages; http://tools.ietf.org/pdf/rfc2215.pdf.

* cited by examiner

SYSTEM AND METHOD FOR PROVIDING A FATE SHARING IDENTIFIER IN A NETWORK ENVIRONMENT

TECHNICAL FIELD

This disclosure relates in general to the field of network communications, and more particularly, to providing a fate sharing identifier in a network environment.

BACKGROUND

The Resource Reservation Protocol (RSVP) is a network control framework that enables source and destination endpoints to "reserve" the resources to establish a data flow between endpoints. The flow can have a certain quality of service, class, priority, etc. and involve any type of data (audio, video, media, etc.). RSVP can operate in conjunction with routing protocols to reserve resources along a data path between the source and destination endpoints. In certain cases, inconsistencies in the network can cause packets and flows to be disturbed or otherwise disrupted. Further, these inconsistencies are more prominent in times of congestion, where packets may be haphazardly dropped. Accordingly, the ability to properly manage data sessions in a network environment presents a significant challenge to equipment vendors, service providers, and network operators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a first portion of an identifier associated with a communication session involving a first endpoint that generated the first portion of the identifier. The method also includes receiving a second portion of the identifier associated with the communication session involving a second endpoint that generated the second portion of the identifier. The method can further include communicating a reservation request associated with a network resource to be allocated for the communication session. The reservation request includes the first portion and the second portion of the identifier.

In more specific implementations, the method can include communicating a call offer toward the second endpoint, where the first and second endpoints are configured to exchange packets after the communication session is established. Additionally, a transfer feature invocation by the first endpoint causes the first portion of the identifier to be changed to reflect a third endpoint being associated with the communication session. In yet other implementations, a feature operation by the first endpoint results in a connected party update for both endpoints, and at a subsequent reservation refresh, the identifier is updated. In specific examples, the first portion and the second portion are processed via a concatenation operation, or via an XOR operation in order to generate the reservation request for the network resource.

In more specific implementations, the reservation request can be a Resource Reservation Protocol (RSVP) reserve message for the network resource, and the communication session can be a voice over Internet protocol (VoIP) session involving a session initiation protocol (SIP). The first portion of the identifier and the second portion of the identifier can be exchanged via call signaling between call agents associated with the first and second endpoints involved in the communication session.

Example Embodiments

Figure 1:
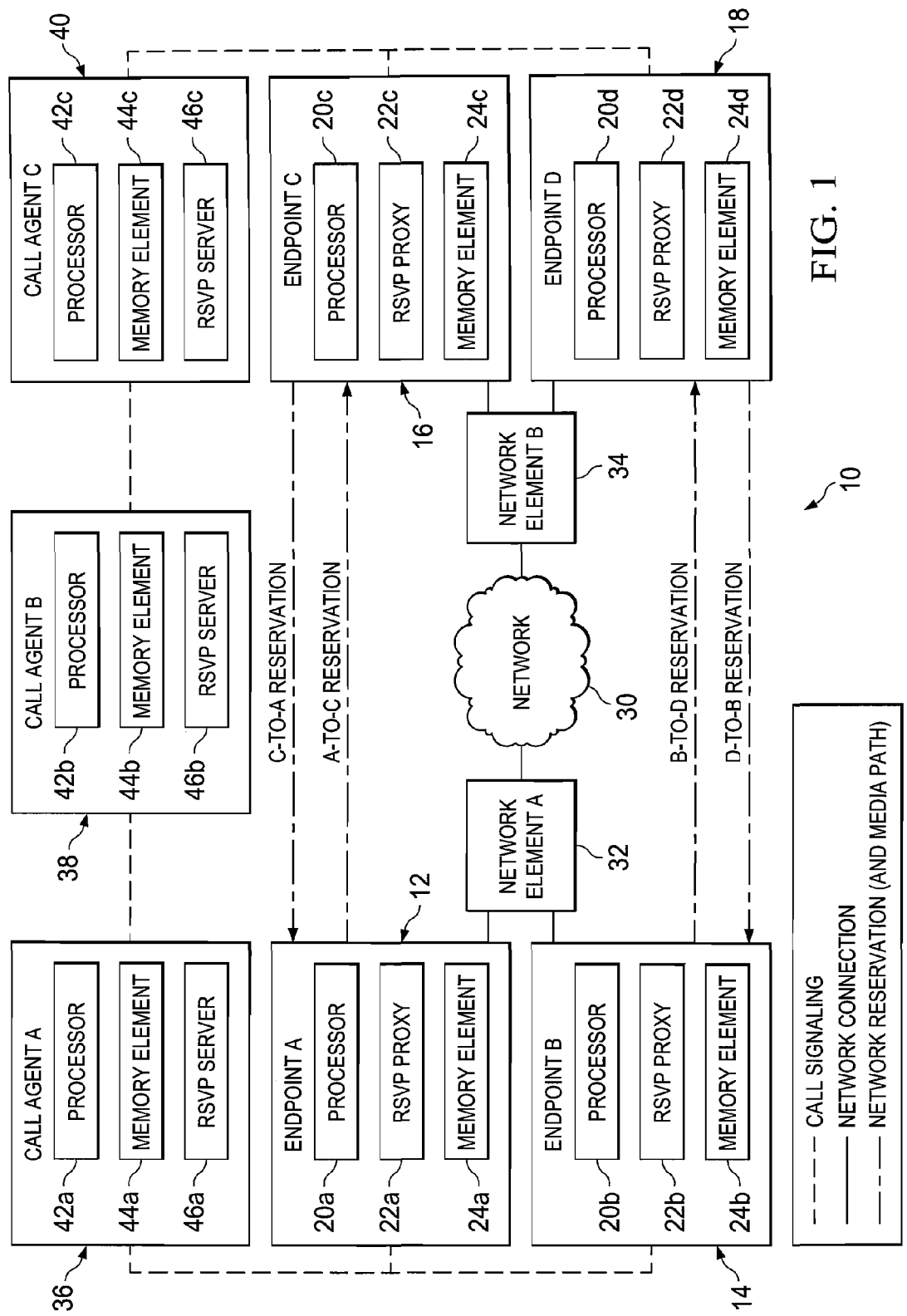
FIG. 1 is a simplified block diagram illustrating a communication system configured for generating fate sharing identifiers in a network environment in accordance with one embodiment of the present disclosure.

Turning to FIG. 1, FIG. 1 is a simplified block diagram illustrating a communication system 10 configured for generating suitable fate sharing identifiers (IDs) in accordance with one example implementation of the present disclosure. FIG. 1 includes a set of endpoints 12, 14, 16, and 18 that are labeled endpoint A, endpoint B, endpoint C, and endpoint D respectively. FIG. 1 also includes a set of network elements 32 and 34, which are labeled network element A and network element B respectively. A set of call agents 36, 38, and 40 are also provisioned in the network, where these call agents are labeled call agent A, call agent B, and call agent C respectively. The call agents, the endpoints, and the network elements can exchange information via one or more networks (e.g., such as through a network 30, as shown in FIG. 1).

Note that a series of dashed lines being depicted in FIG. 1 is representative of call signaling information, which may be exchanged between endpoints and call agents. In addition, solid lines are depicted as being associated with network connections in the architecture of communication system 10. Additionally, network reservation data (and media paths) are shown in broken lines between endpoints, which seek to communicate with each other. In the example of FIG. 1, each endpoint includes a respective processor 20*a-d*, a respective Resource Reservation Protocol (RSVP) proxy 22*a-d*, and a respective memory element 24*a-d*. Similarly, each call agent includes a respective processor 42*a-c*, a respective memory element 44*a-c*, and a respective RSVP server 46*a-c* in the example configuration of FIG. 1.

Communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol, where appropriate and based on particular needs. Unless otherwise indicated in discussions below, network elements can use publicly available protocols or messaging services to communicate with each other through network 30.

In accordance with certain teachings of the present disclosure, communication system 10 is configured to generate fate sharing IDs that are broken into two parts: half being provided by each respective endpoint in a point-to-point flow. The endpoints can combine their respective key halves in a consistent fashion to achieve consistent point-to-point communications. In a specific implementation, the architecture of FIG. 1 can be configured to communicate a consistent fate sharing ID to both ends of a voice over Internet protocol (VoIP) session, which may be associated with a session initiation protocol (SIP) scenario. In a particular instance, certain fate sharing activities can be accomplished by leveraging call agent connected party updates when mid-call features occur in the network.

Note that the fate sharing ID within the RSVP protocol has been defined; however, that definition has not been developed enough to ensure the fate sharing ID would be consistent in the context of simultaneous features being invoked. Certain operational capabilities of communication system 10 can allow the fate sharing key to be built out of two key halves, one half owned by one conversing endpoint and one half owned by the other conversing endpoint. This allows communication system 10 to maintain fate sharing for any given two-party connection and, further, to offer a reliable construct across any set of mid-call features.

In an example configuration, each endpoint includes an agent function (e.g., provided within RSVP proxies 22a-d) that is capable of setting up appropriate call reservations. In one particular instance, RSVP proxies 22a-d can offer an application program interface (API) to be used by a given call agent to set up the appropriate reservation. In general terms, RSVP proxies 22a-d are configured for setting up reservations on behalf of calls. In a reciprocal fashion, each respective call agent can be provisioned with the server-side instance of the API for providing the fate-sharing feature. Note that the term "reservations" in this instance means preserving any type of call resources (e.g., allocations for bandwidth, memory, buffer, processing, etc.) for the communication session. For example, audio requires a certain bandwidth, video requires a certain bandwidth, etc., and without the reservation, the communication session can deteriorate, or otherwise be inoperable.

Semantically, the fate sharing ID discussed herein can be sent within the reservation request. The call agents would monitor the reservations that propagate to them, and make policy changes in the network (i.e., in the routers). In one generic sense, this fate sharing information can empower the network to intelligently purge flows (e.g., in cases of network congestion). Before proceeding further in detailing these purging activities, it is important to understand the network issues applicable in many fate-sharing scenarios. The following foundational information may be viewed as a basis from which the present disclosure may be properly explained.

Many media architectures offer mechanisms to manage network congestion in a structured fashion. The mechanisms can be based on enhancements to RSVP, which allows endpoints to request the network infrastructure to set aside scheduler call resources on behalf of specific end-to-end flows (i.e., at the expense of other flows). Hence, RSVP is a network protocol that enables source and destination endpoints to reserve resources to establish a data flow in accordance with the flow's properties (e.g., necessary bandwidth, required quality of service (QoS), established priority, latency characteristics, etc.). If a router encounters congestion, packets related to flows with reservations are delivered instead of packets related to flows without reservations.

In a typical arrangement, the source endpoint can send an RSVP Path message identifying itself, and indicating the minimum bandwidth needed to receive the data flow. The Path message can proceed hop-by-hop through the data path: making each intermediate network node aware that a reservation of resources may be requested. The destination node can receive the RSVP Path message and respond with a "request for resources" in the form of a RSVP reservation request (Resv message), which can travel hop-by-hop back to the source endpoint. At each hop, the corresponding intermediate network node can set aside sufficient resources to provide the requested bandwidth for the desired data flow. These resources are made available to the data flow such that the data packets of the flow get appropriate treatment.

Note that if sufficient resources are not available, an intermediate network node may "reject" the Resv message (i.e., does not continue forwarding it), generate a reserve error (ResvErr) message, and forward the ResvErr message downstream over the path to the destination endpoint. The destination endpoint eventually receives the ResvErr message and concludes that the reservation has failed. A destination endpoint whose Resv message has been rejected may later re-attempt to acquire the resources by re-transmitting another Resv message. Source endpoints are generally unaffected by this process, and they continue to send Path messages to refresh their state.

Admission control involves reserving resources on a policy basis, in conjunction with using capacity as a basis for accommodating the reservation request. A simple example of such a policy is an authentication/authorization policy. If an endpoint attempts to reserve bandwidth, but it is unknown to the administrator, or if the endpoint makes an unauthorized request, the request will be denied based on the authentication/authorization policy: even if bandwidth is available. Among authorized (i.e., equal) requesters, bandwidth is granted on a first-come-first-admitted basis.

Each fate shared data flow is associated with a unique identifier, such as a universal unique identifier (UUID). The UUID is preferably unique in both space and time. For instance, the UUID may be derived from a combination of a media access control (MAC) address and a timestamp associated with at least one of the data flows in the fate-sharing group. The UUID may be stored in a "fate sharing object" (FSO) that can be distributed to each of the network nodes that transmit and/or receive data flows in the group of fate sharing flows. The FSO may be disseminated among the client endpoints using an end-to-end signaling protocol such as SIP, H.323, etc., or by other appropriate mechanisms (e.g., from a central server). The FSO can be included in resource reservation messages that are sent from the client nodes into the network.

In more practical terms, many end-to-end sessions consists of multiple flows. For example, a scheduled conference may have an audio flow, a video flow, a presentation flow, a floor-control channel, a video control channel, etc. Furthermore, in most networking scenarios, the flows are commonly two-way. If, from a router's perspective, significant congestion is encountered, and if there are 100 flows propagating in one direction and 100 propagating in another direction, it may be appropriate to purge half the flows. If it chooses those flows at random, the impact of its preemption decision may impact more than half of the end-to-end sessions. For example, if a purged conversation is occurring between Peter and Steve, and a second conversation is occurring between John and Jim, when the system purges have of the audio (e.g., purges Peter's audio and John's audio), all of the aforementioned sessions have been disrupted even though only half of the flows have been purged.

Hence, there is an inherent problem in these blunt purging activities. Additionally, for a network of call agents based on a back-to-back user agent (B2BUA) model, generating a fate sharing identifier that can remain consistent across possible feature operations is difficult. In a default model for RSVP, the endpoints themselves issue reservation requests to each other. Call signaling can be used to coordinate the sending of these reservations with the call offering, but from a basic standpoint, it is important that the endpoints exchange the following reservation messages:

---- PATH ---->
    <--- RESV ----
    ---- RESVCONF ---->
    <---- PATH ----
    ---- RESV ---->
    <---- RESVCONF ----

The reservations can have a limited lifetime and, further, the endpoints can keep the reservations current by periodically exchanging another sequence of messages. This also relates to partial network outages.

In the context of fate sharing, the endpoint A-to-endpoint B reservation should have a key 'x' that is also used in the independent endpoint B-to-endpoint A reservation. The validity of this key should be maintained and updated as mid-call features are invoked. For instance, if endpoint A (e.g., associated with an end user Alice) calls endpoint B (e.g., associated with an end user Bob), and then a subsequent feature is triggered and redirects Alice's call leg to endpoint C (e.g., associated with an end user Carol) and Bob's call leg to endpoint D (e.g., associated with an end user Donald), the fate sharing ID needs to be changed on at least one of the calls. In this instance, Alice is no longer talking to Bob. If the network decides to purge Alice's outbound flow with the fate sharing ID x, it should purge Carol's inbound flow, and not purge Bob's flow. Hence, there should be mid-call remarking, which is propagated down the reservation at the next refresh. This can happen as a result of a call agent feature (e.g., in a back-to-back user agent (B2BUA)), which may be associated with a type of SIP application. Hence, it is the call agent that has to broker the changing fate sharing ID, which means that the call agent should be configured to remember the ID and to implement a method for updating the endpoints.

Finally, due to the way that many B2BUAs operate, the call agent should also be responsible for generating new fate sharing IDs. This happens because B2BUAs often handle features through mid-call "split/join" operations in which the endpoints are simply informed of a new media endpoint along with a connected party display name change. In the example above, when Alice is joined to Carol, Alice's call leg remains intact, but the remote media peer information changes to indicate Carol's media information. In this instance, Alice's endpoint cannot pick the fate sharing ID because the action originates from the B2BUA.

In regards to the B2BUA internals, for a B2BUA Alice/Bob call, there is typically an object that represents Alice's device and an object that represents Bob's device (i.e., there is data associated with the Alice-Bob communication session). One theory in solving certain inconsistencies may involve putting the fate sharing ID in the call object, and when a feature is invoked, a new fate sharing ID is selected, where the new value is sent as a message to the endpoints that require an update. However, such a solution is inoperable because endpoint calls often traverse a chain of call agents.

As signals propagate through the network, and because the calls "x" are trying to cache and to recall the updated fate sharing ID, these devices stamp the updated fate sharing ID into memory. This results in Carol and her corresponding call agent getting a stamped value of "x" and Donald and his call agent getting a stamped value of "y", with the center call agent being in a non-deterministic state. The fate sharing has effectively been lost.

One strategy to solve this issue may involve a type of end-to-end locking protocol. For example, before changing the end-to-end ID, Alice's call agent would lock down everything in the Bob direction and, when confirmed, send the change through the network. However, this presents a logistical dilemma because the end-to-end lock takes time to acquire and, further, the events along the locked arc are being queued. Such a strategy would also encounter other difficulties with simultaneous features: making such provisioning unworkable.

To address the aforementioned issues (and others), communication system 10 can use fate sharing IDs that are broken into two parts being provided by respective endpoints. Thus, instead of relying on a single key, which should be stamped into every call object "X" along the end-to-end path, communication system 10 can rely on the fate sharing ID's being composed of two half-keys: each of which is associated with the corresponding endpoint's stable device state. An intelligent two-part fate sharing identifier permits the infrastructure to bundle flows to make an informed preemption decision. This is in contrast to terminating random flows in each direction, where instead of these activities, communication system 10 can remove flows related to a given session, and leave other flows undisturbed. Revisiting the example above, and in the context of B2BUA, Alice's call leg would not go away until she hung-up the call and, if features were invoked, a half-key hung on Alice's device is still valid. Before detailing additional fate-sharing operations below, a brief overview is provided about the infrastructure of FIG. 1.

Endpoints 12, 14, 16, and 18 are user devices capable of engaging in a collaborative communication session in accordance with one example implementation of communication system 10. Endpoints 12, 14, 16, and 18 can readily accommodate video, audio, multimedia, etc. and exchange any type of information in a network environment. The term "endpoint" is simply representative of any suitable device that seeks to send and/or receive network data. The endpoint can be associated with various types of protocols, or potential applications to achieve their intended functionality (e.g., SIP, H.323, MGCP, Megaco, Skinny Call Control Protocol (SCCP), real-time streaming protocol (RTSP), H.225, H.245, etc.). For certain SIP applications, the key half can be provisioned as a header or a URI parameter on the SIP Contact: (e.g., Contact: alice@cisco.com <Alice>;fate-share=AliceX). It should also be noted that there are certainly other mechanisms, provisioning, and locations for which the key half could be allocated.

The broad term 'endpoint' is inclusive of devices used to initiate a communication, such as any type of computer, a personal digital assistant (PDA), a laptop or electronic notebook, a wireless access point, web browser, a residential gateway, a modem, a cellular telephone, an iPhone, an IP phone, iPad, or any other device, component, element, or object capable of initiating or facilitating voice, audio, video, media, or data exchanges within a network environment. Moreover, endpoints may be inclusive of a suitable interface to the human user, such as a microphone, a display, or a keyboard or other terminal equipment. The endpoints may also be any device that seeks to initiate a communication on behalf of another entity or element, such as a program, a database, or any other component, device, element, or object capable of initiating an exchange within a network environment. Data, as used herein in this document, refers to any type of numeric, voice, video, media, or script data, or any type of source or object code, or any other suitable information in any appropriate format that may be communicated from one point to another.

Endpoints 12, 14, 16, and 18 can be managed by a network of call agents 36, 38, and 40 that can be configured to coordinate control signaling and media for those endpoints. More specifically, each call agent may be provisioned with appropriate software that manages features on behalf of its associated endpoint. Each call agent 36, 38, and 40 may also help in brokering network reservations. In one particular example, call agents 36, 38, and 40 are servers that can interact with each other and with corresponding endpoints. Network elements 32 and 34 can be viewed as carriage mechanisms for packet signaling, data and packet media, and/or any other type of informational exchange involving endpoints 12, 14, 16, and 18. In one particular instance, network elements 32 and 34 are routers, gateways, or switches configured to interface with endpoints 12, 14, 16, and 18. Note that call agents 36, 38, and 40 are also potentially representative of 'network elements.'

As used herein in this Specification, the term 'network element' is meant to encompass routers, gateways, switches, firewalls, in-line service nodes, servers, application program interfaces (APIs), proxies, processors, modules, or any other suitable device, component, element, or object operable to exchange information in a network environment. These network elements may include any suitable hardware, software, components, modules, interfaces, or objects that facilitate the operations thereof. This may be inclusive of appropriate algorithms and communication protocols that allow for the effective exchange (reception and/or transmission) of data or information.

In one example implementation, call agents 36, 38, 40, and endpoints 12, 14, 16, and 18 include software (e.g., as part of RSVPs servers 46a-c and/or RSVP proxies 22a-d, etc.) to achieve the intelligent fate sharing ID operations, as outlined herein in this document. In other embodiments, this feature may be provided externally to any of the aforementioned elements, or included in some other network element (which may be proprietary) to achieve this intended functionality. Alternatively, several elements may include software (or reciprocating software) that can coordinate in order to achieve the operations, as outlined herein. In still other embodiments, any of the devices of the illustrated FIGURES may include any suitable algorithms, hardware, software, components, modules, interfaces, or objects that facilitate these endpoint management operations.

Call agents 36, 38, 40, and endpoints 12, 14, 16, and 18 may share (or coordinate) certain processing operations. Using a similar rationale, their respective memory elements may store, maintain, and/or update data in any number of possible manners. Additionally, because some of these network elements can be readily combined into a single unit, device, or server (or certain aspects of these elements can be provided within each other), some of the illustrated processors may be removed, or otherwise consolidated such that a single processor and/or a single memory location could be responsible for certain activities associated with endpoint management controls. In a general sense, the arrangement depicted in FIG. 1 may be more logical in its representations, whereas a physical architecture may include various permutations/combinations/hybrids of these elements.

Figure 2:
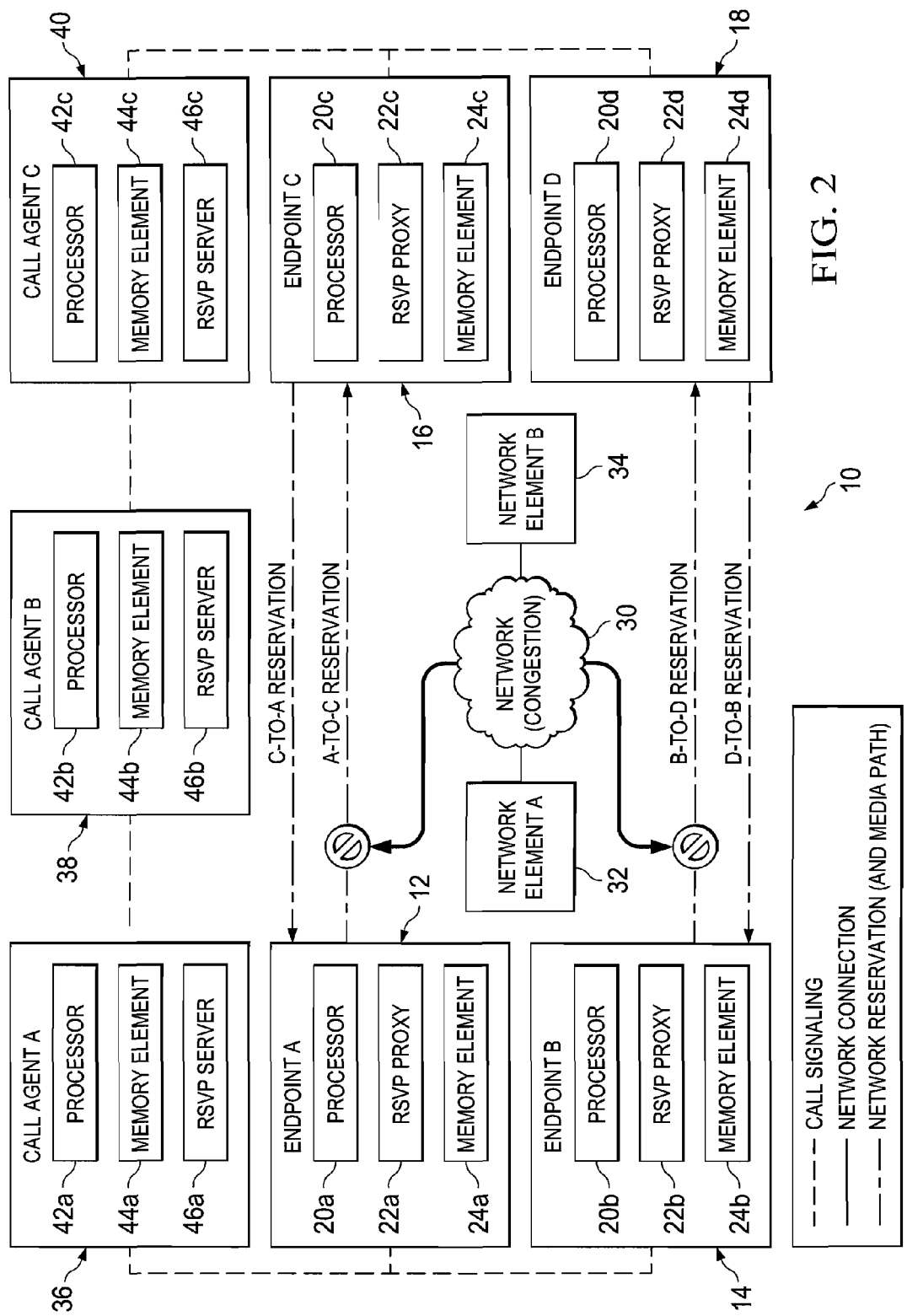
FIGS. 2-14 are simplified block diagrams illustrating example operations associated with the communication system in accordance with certain embodiments of the present disclosure.

Turning to the subsequent FIGURES, FIGS. 2-14 are simplified block diagrams that further detail operations associated with communication system 10. More specifically, these FIGURES highlight common network problems associated with fate sharing and, further, walk through implementing the two key halves, as discussed throughout this Specification. FIG. 2 is a simplified block diagram illustrating how network congestion can cause consistency problems for communication system 10. When congestion occurs in the network, certain packets may be dropped or otherwise managed out of the network. Without appropriate fate sharing protocols, flows from different calls may be purged, which can result in one-sided conversations. This is being illustrated in FIG. 2, where flows associated with endpoint A and endpoint B are being negatively affected by these purging activities. This problem could have been avoided by using the fate sharing ID that included the two key half mechanism discussed herein.

Figure 3:
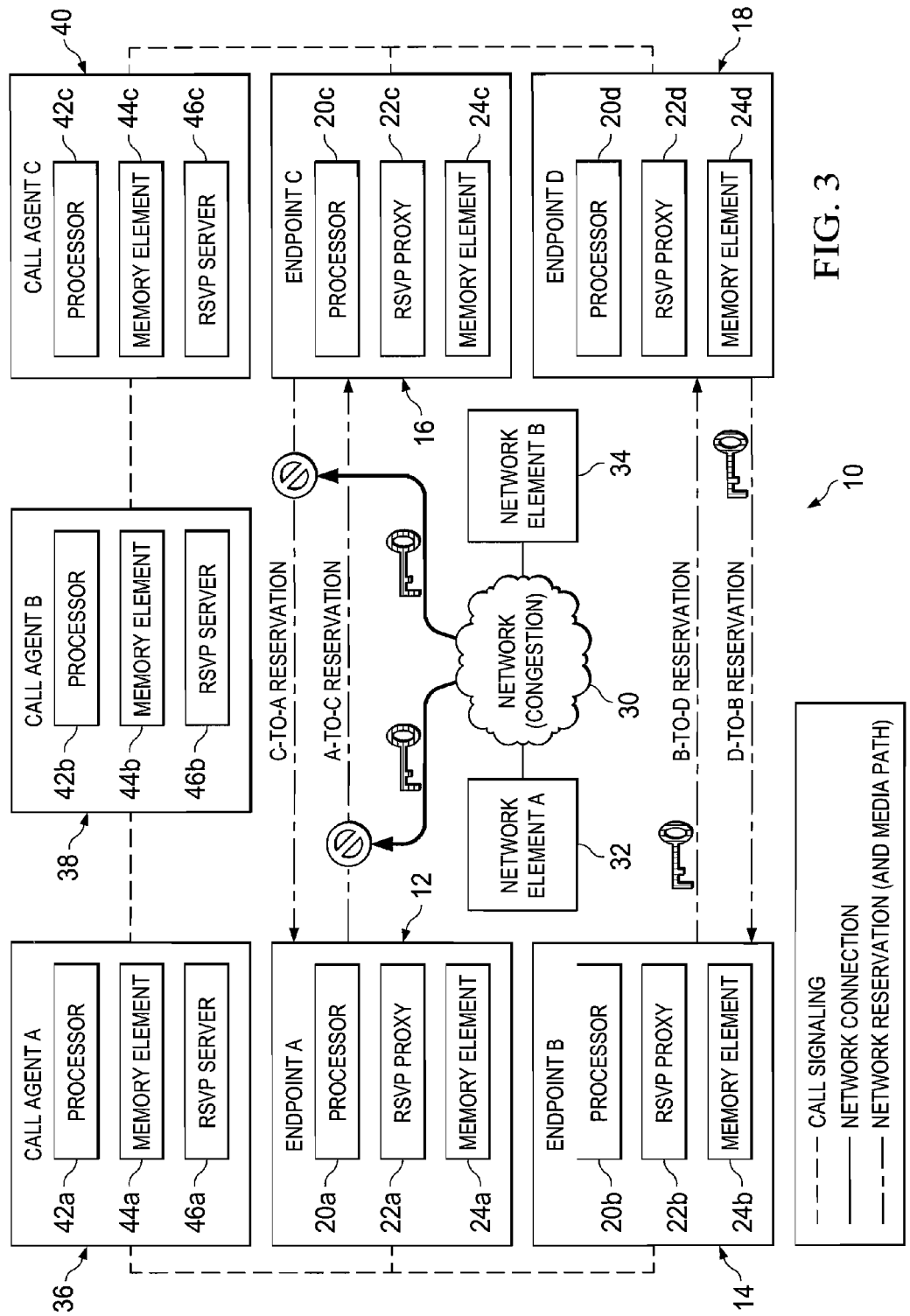

FIG. 3 is a simplified block diagram illustrating how particular flows can be purged in the network. For example, in using the teachings of the present disclosure, a given network can understand which flows are related to each other. For example, the network can purge the flows related to a single session, instead of purging some flows and independent sessions. This is being shown by two types of keys in FIG. 3, where each key corresponds to a set of endpoints engaged in a communication session (e.g., endpoints A and C, and endpoints B and D).

Figure 4:
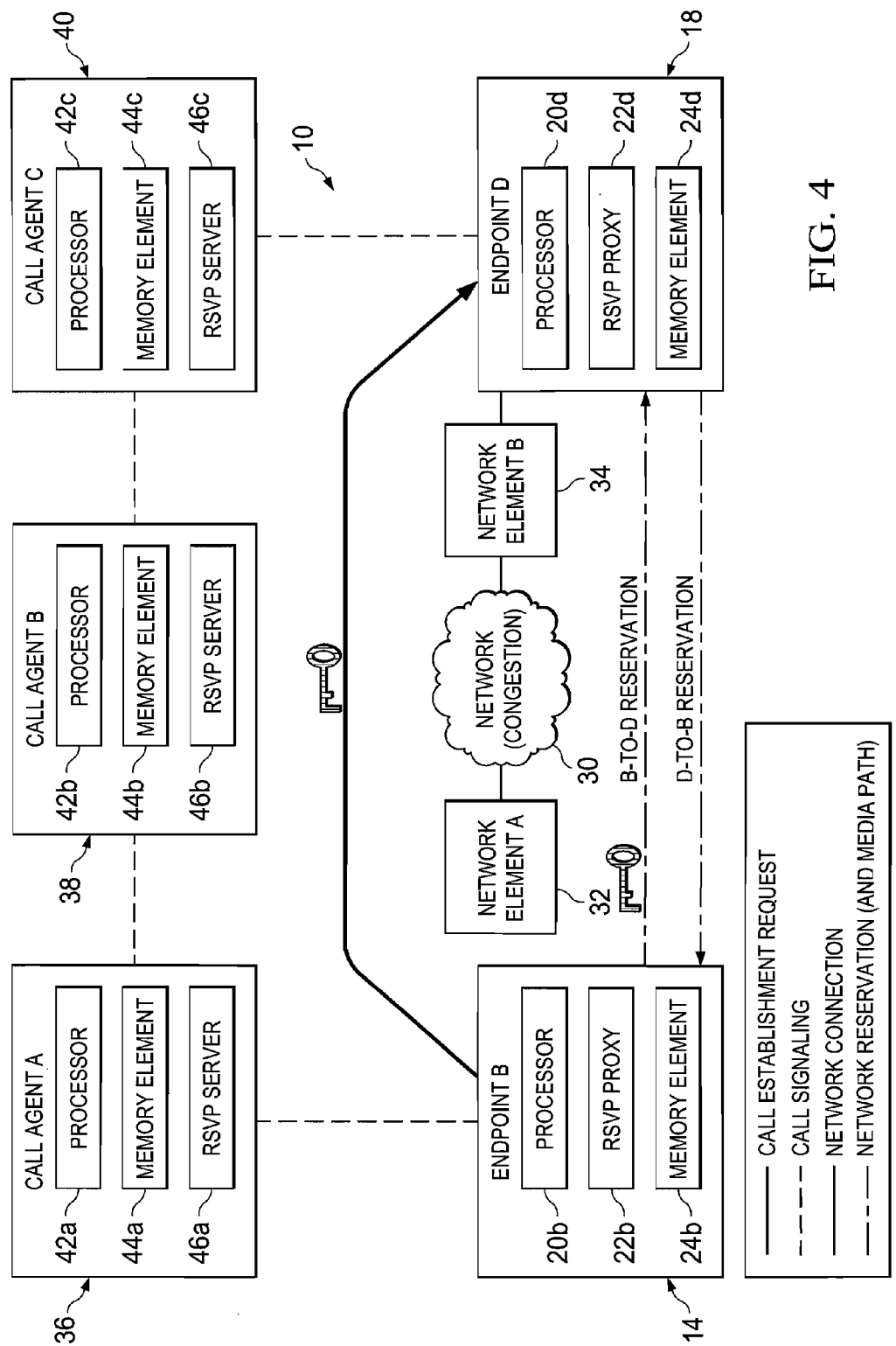

FIG. 4 is a simplified block diagram that further details activities associated with a call recipient. Additionally, FIG. 4 illustrates a call establishment request being sent from endpoint B to endpoint D. For fate sharing to be operational, a given call recipient should use the same fate sharing ID that the call originator has used. The call signaling should provide a mechanism that allows the endpoints to agree on the appropriate fate sharing ID. This can be accomplished through headers on the forward and backward signaling messages. Alternatively, another way to achieve this objective would be to make the ID an attribute of the calling/connected party information. When features are subsequently invoked, endpoints and intervening call agents generally attempt to refresh these values (i.e., end-to-end).

Figure 5:
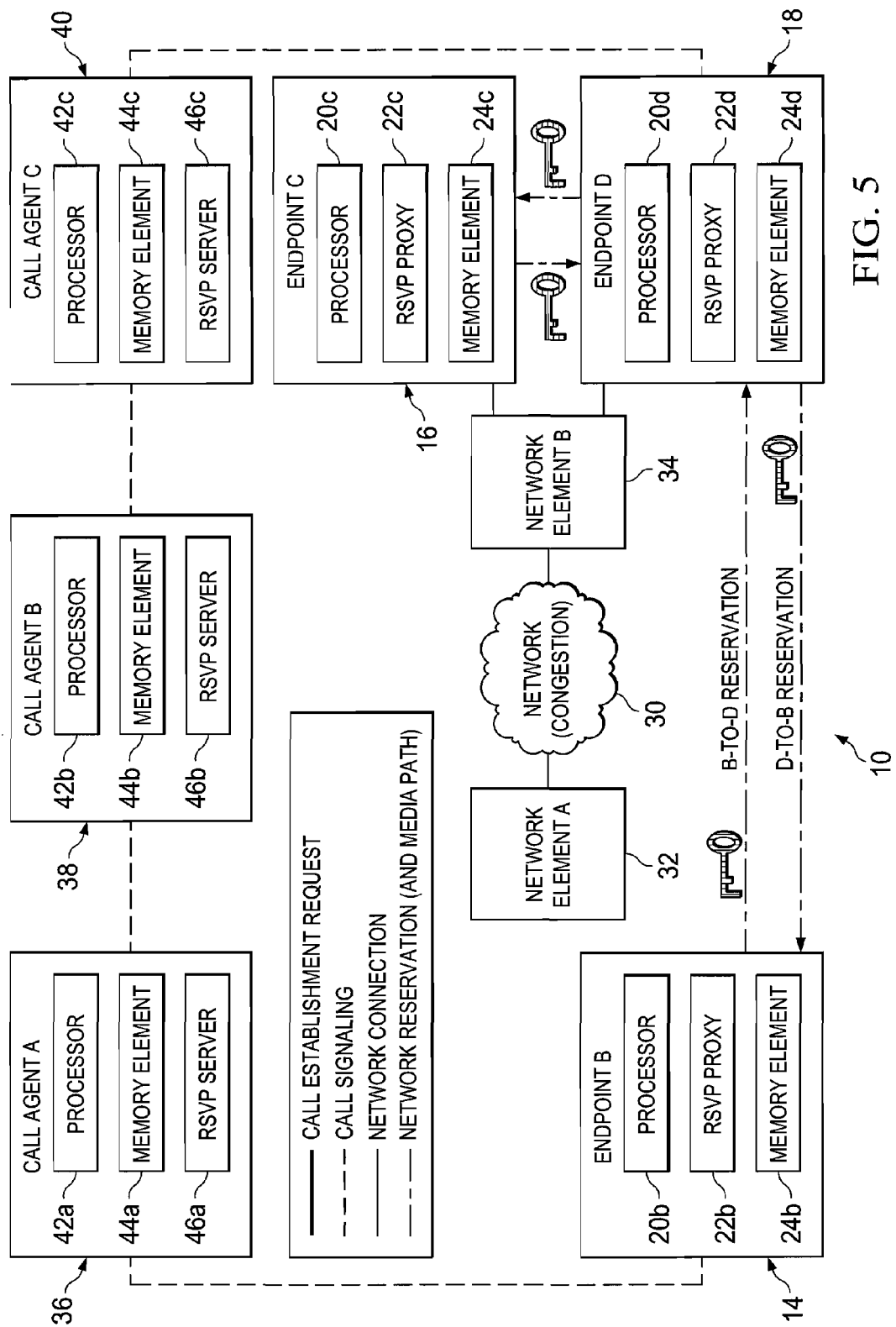
Figure 6:
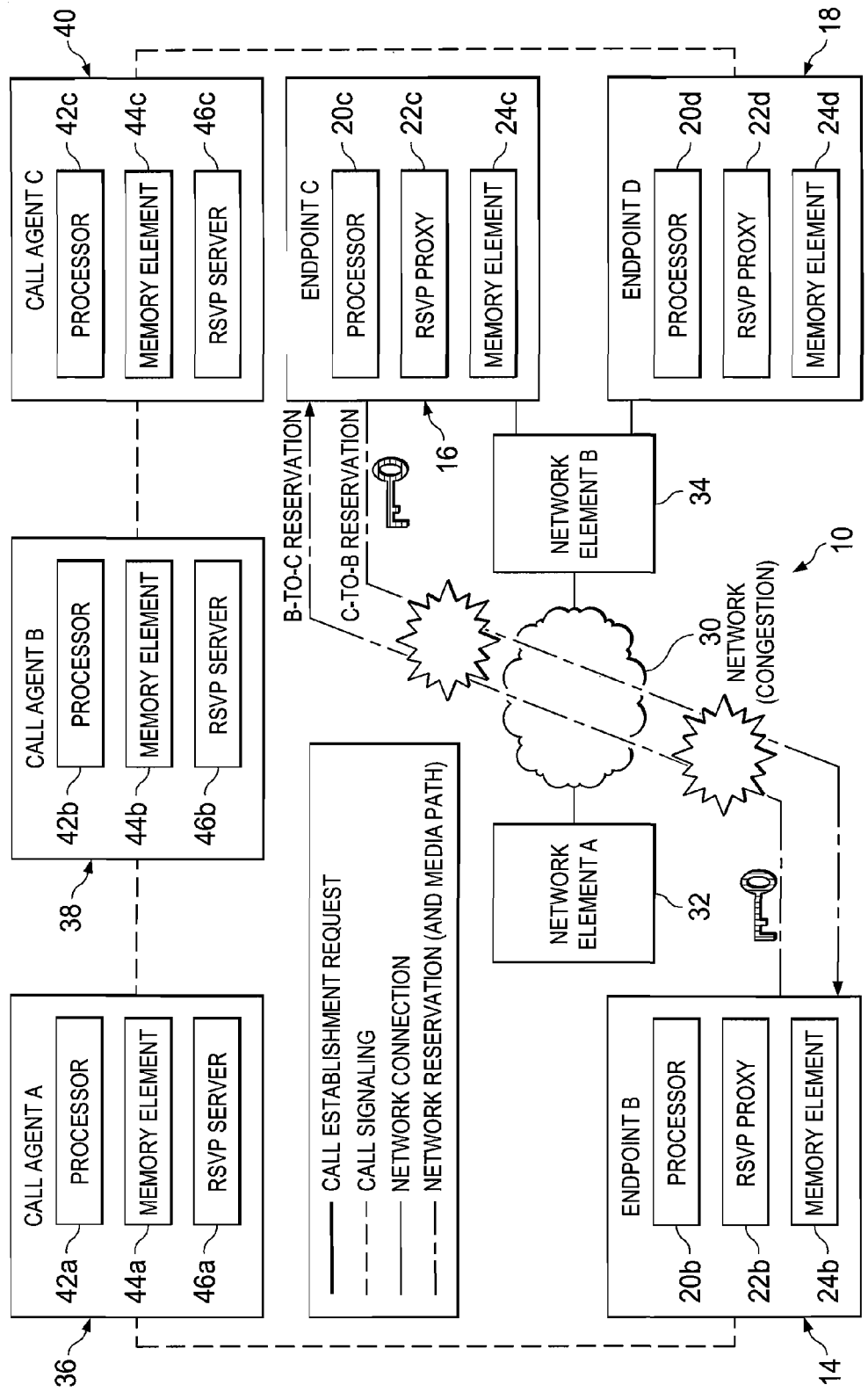

FIG. 5 is a simplified block diagram illustrating interaction between endpoints C and D. More specifically, FIG. 5 is depicting that features can cause two independent sessions to become related. In this particular instance, there is an endpoint B-to-endpoint D session, along with a consultation that is occurring between endpoint C and endpoint D. FIG. 6 illustrates synchronization issues that may occur in the architecture. Note that when endpoint D transfers endpoint B to endpoint C, these endpoints should agree on a fate sharing ID because their keys would inherently be different, if the teachings of the present disclosure were not adopted. The call signaling should guarantee that the endpoints are synchronized. In the illustration of FIG. 6, there is an inconsistency being shown when the endpoints did not agree on the appropriate fate sharing ID.

Figure 7:
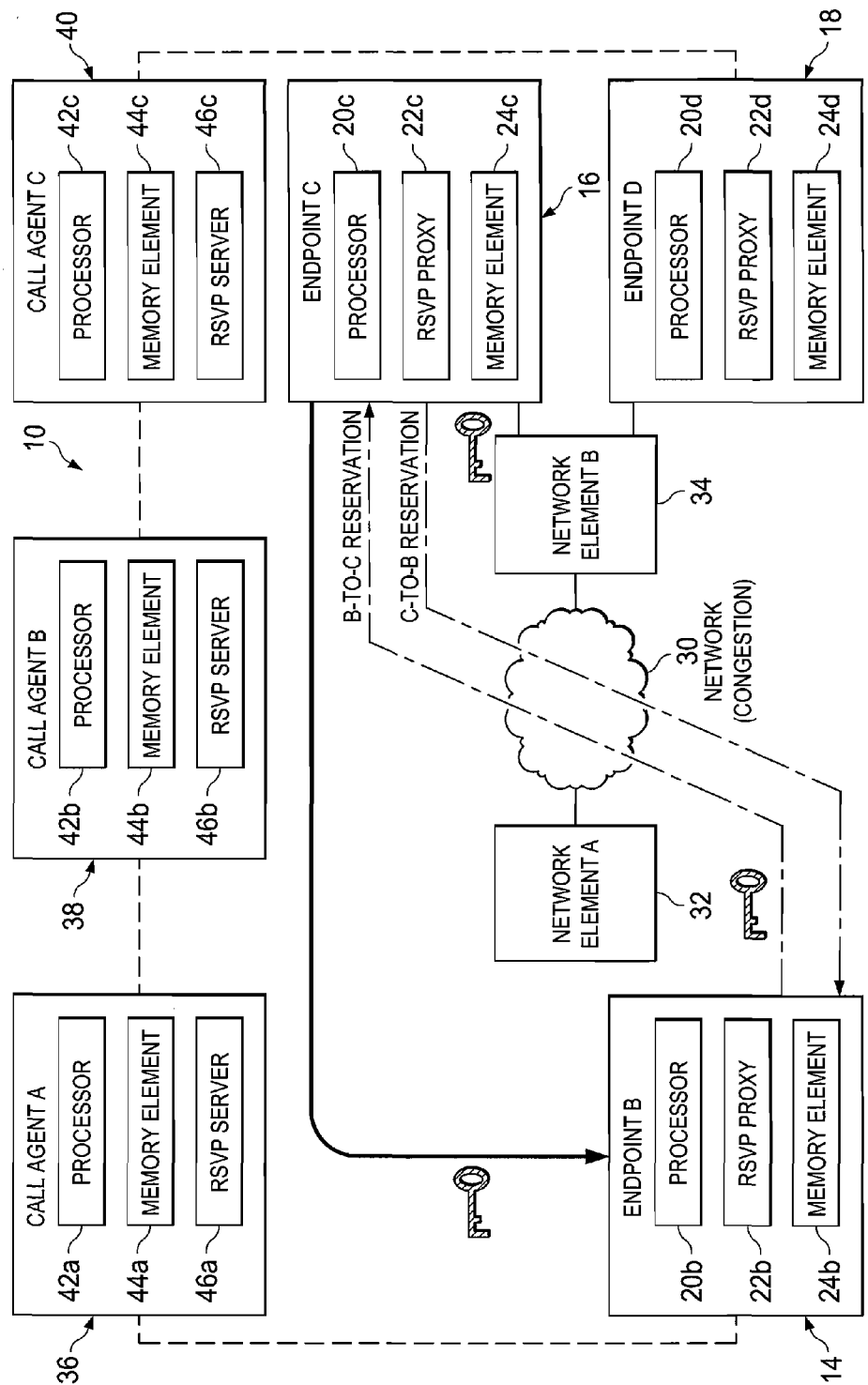
Figure 8:
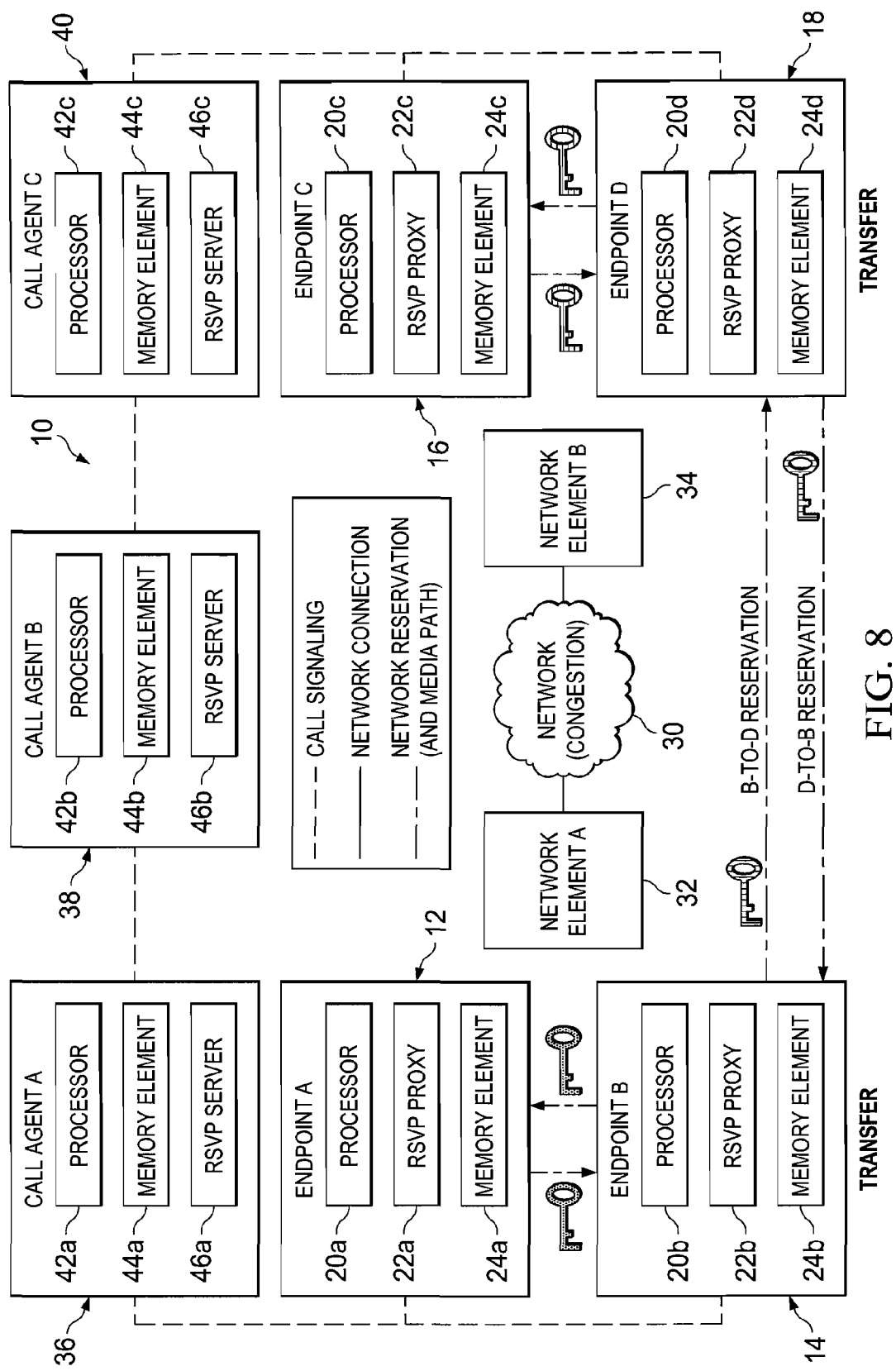

FIG. 7 is a simplified block diagram illustrating activities associated with fate sharing in the context of feature invocation in the network. If a feature (e.g., a transfer feature) is invoked, then the invoking endpoint (or its associated call agent) can communicate the fate sharing ID to the other endpoint. In this particular instance of FIG. 7, an appropriate fate sharing ID has been sent to endpoint B to use. FIG. 8 illustrates problems that can occur when both endpoints invoke certain features simultaneously. For example, when both endpoints of a communication session engage in a transfer operation simultaneously, a significant problem occurs. In this particular instance of FIG. 8, endpoint D is transferring a call to endpoint C, while endpoint B is transferring a call to endpoint A.

Figure 9:
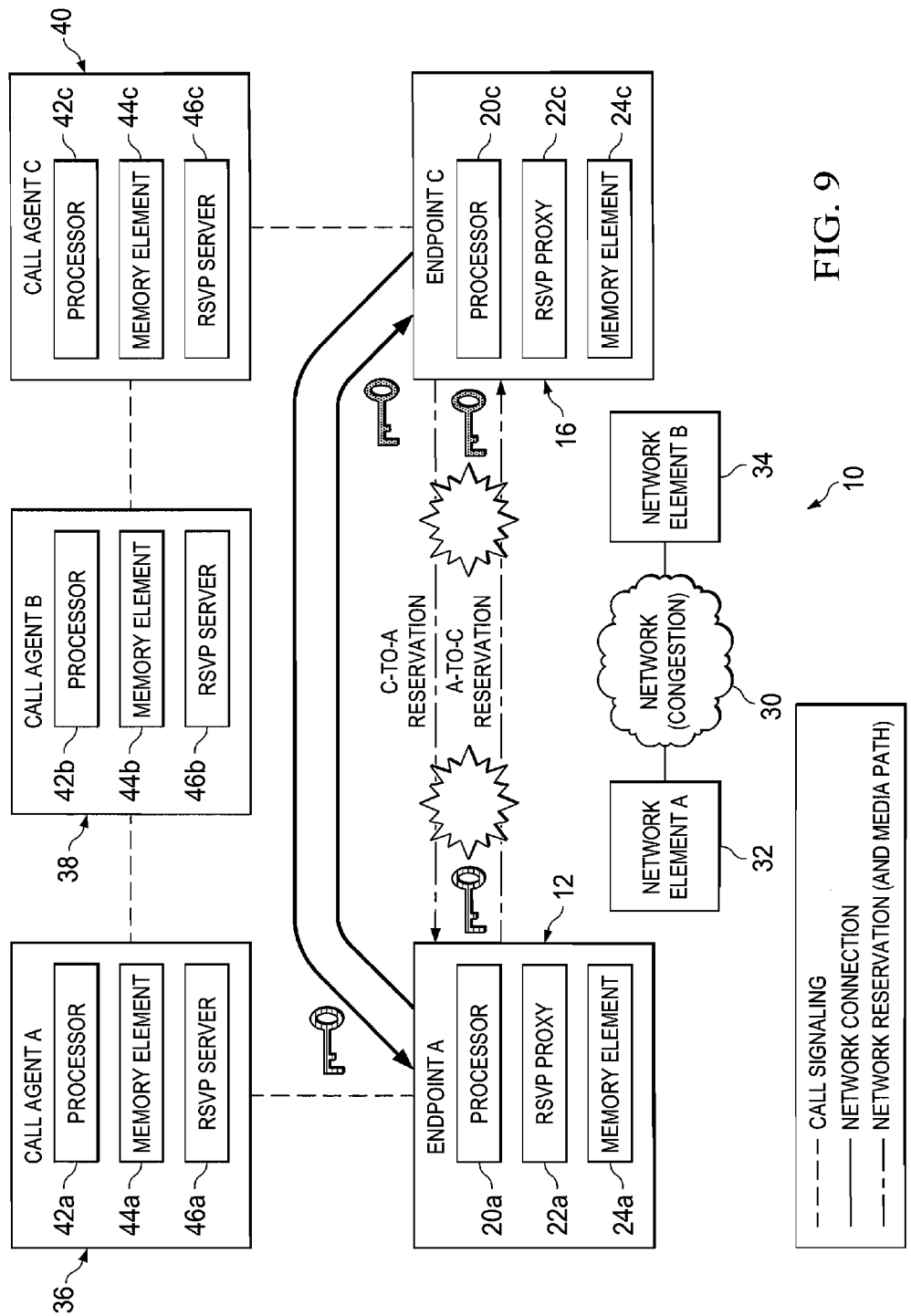

FIG. 9 is a simplified block diagram illustrating problems that can occur for synchronizing endpoints in the network. In this particular example, each endpoint (or its associated call agent) attempts to communicate the new fate sharing ID to its respective far end. Additionally, each endpoint receives a copy of the fate sharing ID from its counterparty endpoint and, at this juncture, the sessions are now out of synchronization. This issue could have been obviated by using two key halves as the fate sharing ID, as depicted in FIG. 10.

Figure 10:
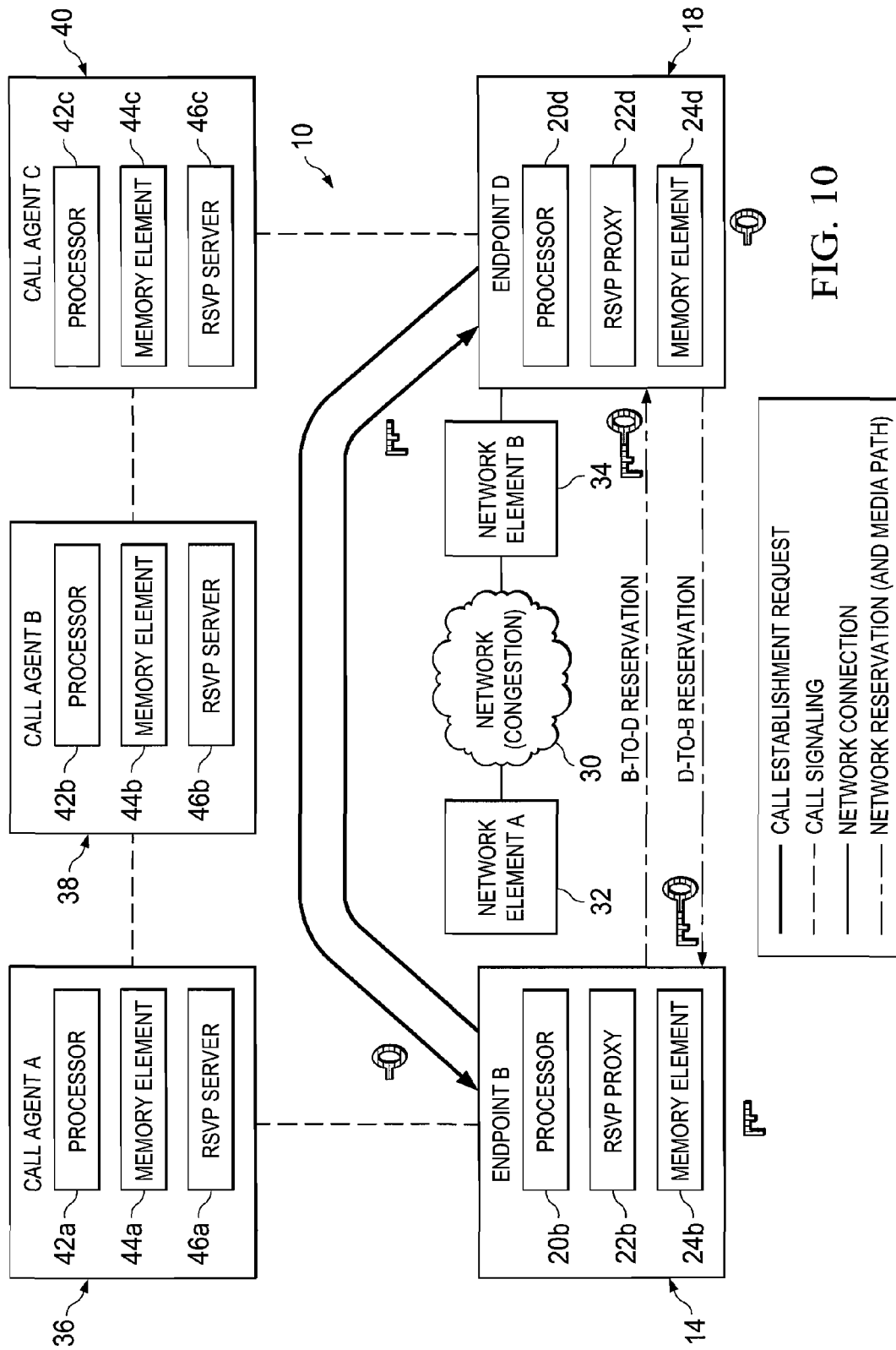
Figure 11:
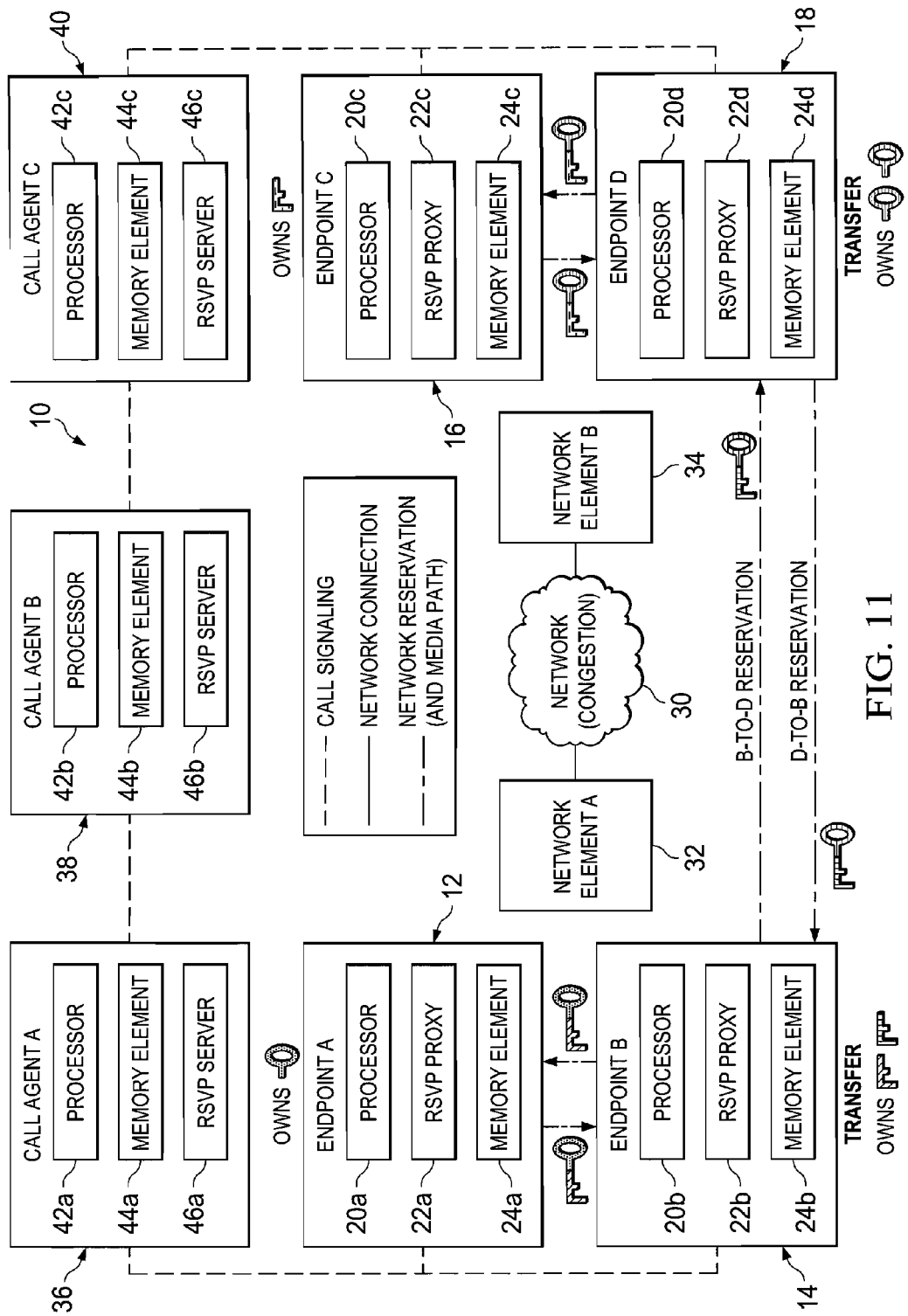

FIG. 10 is a simplified block diagram illustrating how communication system 10 can employ a two-part fate sharing ID to effectively manage communication sessions in the network. Each endpoint can control the identifier for half of the fate sharing ID. The combination can be subsequently used for the actual reservation, where keys can be concatenated, XOR-ed, or suitably processed in any other fashion using any type of logic operations. [Note that as used herein in this Specification, the term 'identifier' is inclusive of any type of indicator, name, representation, header information, flag, option setting, and/or object that could be associated with a given endpoint.] In the example block diagram of FIG. 11, the assumption is that endpoint D is transferring a call to endpoint C. Additionally, in this particular example, endpoint B is transferring a call to endpoint A. Note that both the endpoint A-to-endpoint B session, and the endpoint B-to-endpoint D session have both negotiated their respective two-part fate sharing IDs. Each endpoint would 'own' one-half of the fate sharing ID for each session to which the endpoint would be involved.

Figure 12:
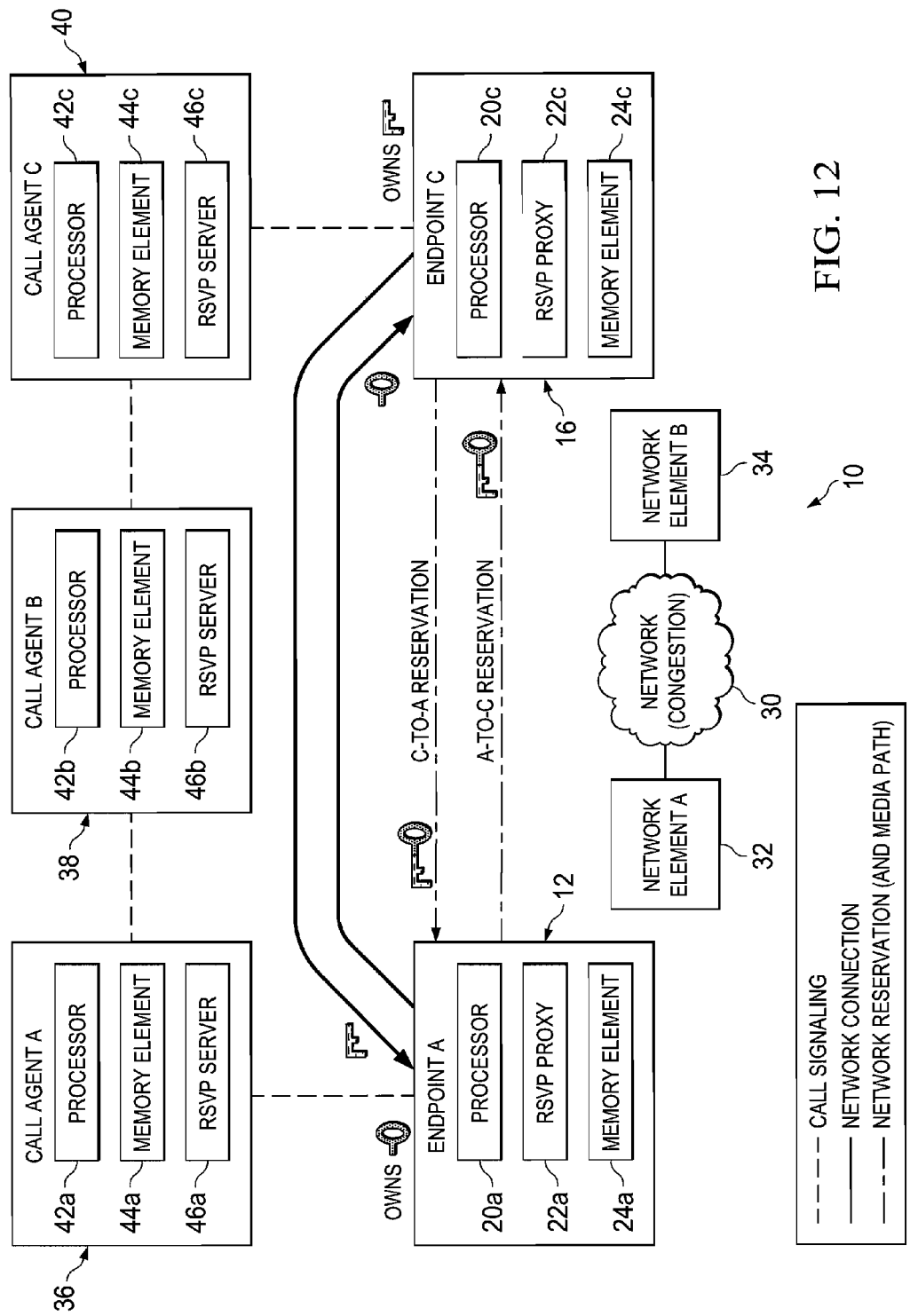

FIG. 12 is a simplified block diagram that illustrates the resultant of using the two-part fate sharing ID. In this particular example, after both transfer operations have been completed, the fate sharing IDs are automatically synchronized. Once the fate sharing ID has been resolved, the endpoints would be free to communicate their data in the ensuing communication session.

Note that call agents commonly send connected party information when features are invoked. In the case of feature invocation (e.g., a double-transfer example), such activities can create two new device state objects that can assign their own fate sharing ID. The feature operation results in connected party updates for both ends of the call. Again, this can occur naturally as part of connected party updates and, at the next reservation refresh, the network would be updated with the new combined key. The information propagating in the network is direction-based such that no data corruption would exist. Semantically, only a half key is being overwritten, not a single full key. Additionally, it should be noted that the identifier key is endpoint leg-based such that as features are invoked, at least a portion of the key can change. Note that some of the key state can also be held by any of the intervening call agents.

Figure 13:
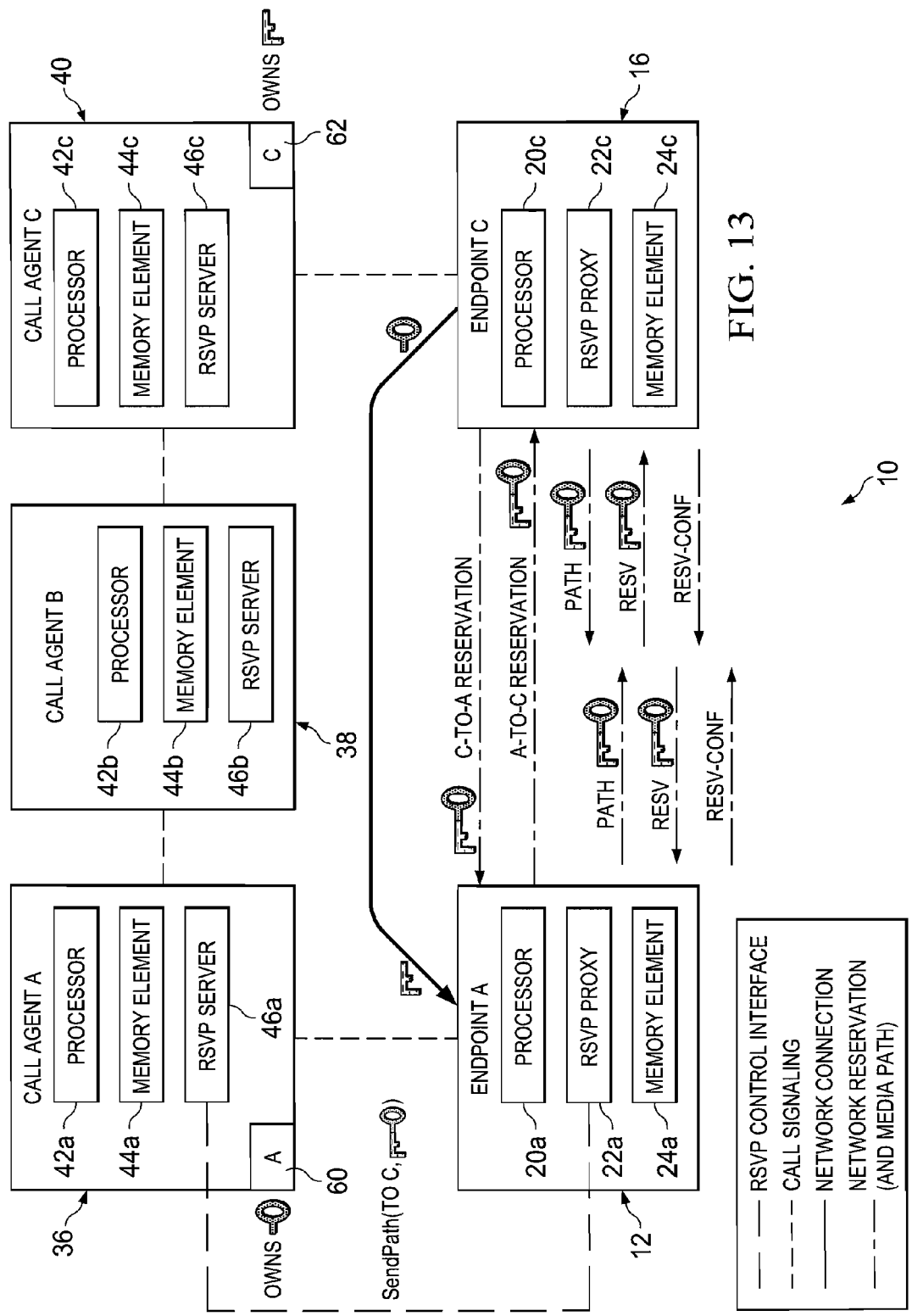

FIG. 13 is a simplified block diagram illustrating a simple flow that may be properly coordinated in accordance with the teachings of the present disclosure. The appropriate path signaling is also depicted for corresponding endpoints, where appropriate RSVP control interface data is also being shown in this particular illustration. Note that call agent A includes an element A 60, which is representative of its ownership (e.g., or its responsibility) for that particular key half. Endpoint A can send the path information to endpoint C via respective call agents. Endpoint C can respond with its fate sharing ID half in order to complete the appropriate key. Note that call agent C includes an element C 62, which is representative of its ownership for that particular key half. The reservation can be suitably established after the fate sharing key has been developed, where a reservation confirmation can subsequently be exchanged.

Figure 14:
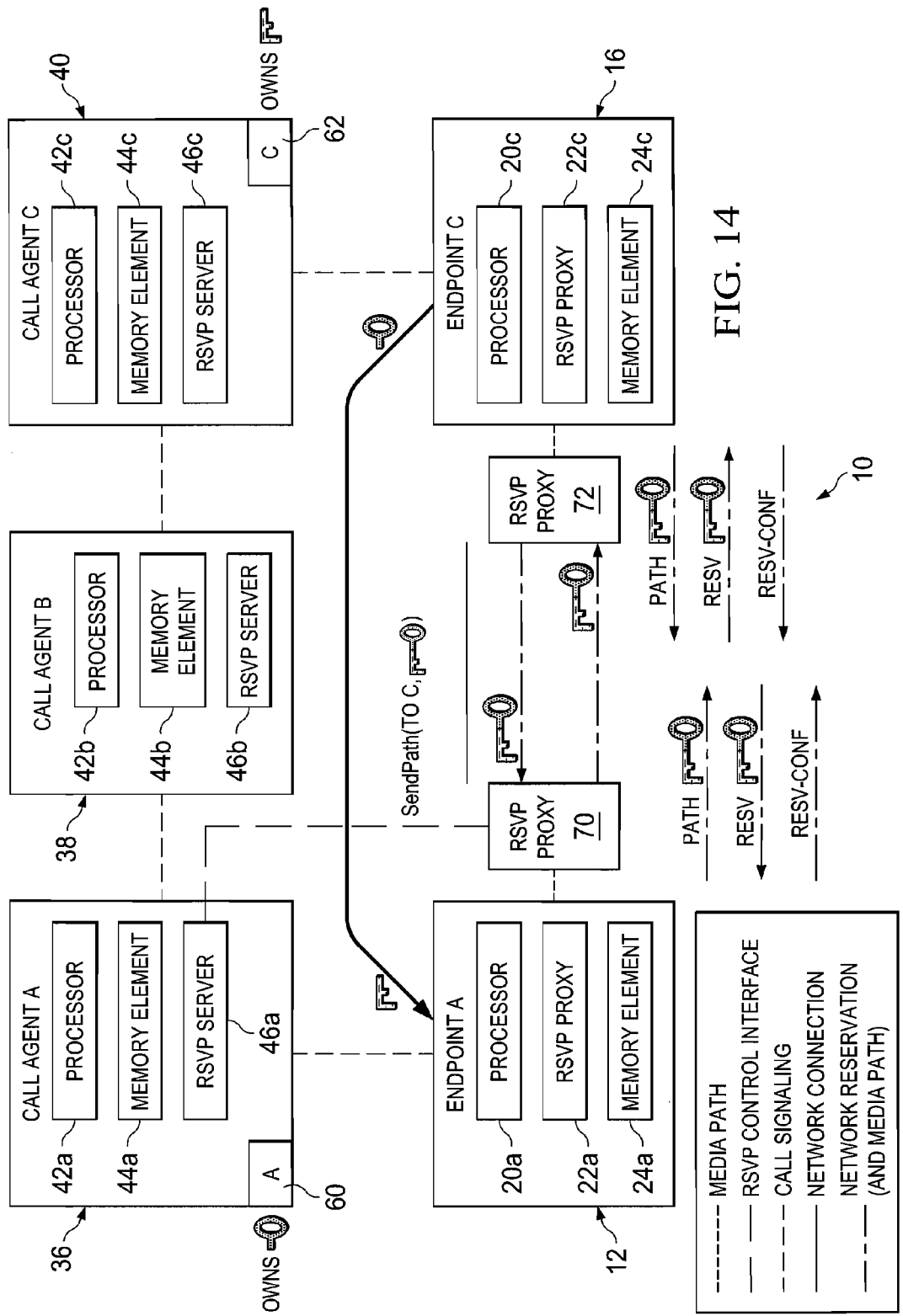

FIG. 14 is a simplified block diagram illustrating operations that are similar to those discussed previously; however, in this example instance, a set of RSVP proxies 70 and 72 can be provisioned as separate devices. The flows of FIG. 14 are similar to the flows of FIG. 13, where an endpoint A can send the appropriate path information to an endpoint C via respective call agents. Endpoint C can respond with its fate sharing ID half in order to complete the (full) fate sharing ID. The reservation can be suitably established after the fate sharing key has been developed, where a reservation confirmation can subsequently be exchanged. At that juncture, endpoints A and C can exchange any appropriate data during a communication session (e.g., media data).

Figure 15:
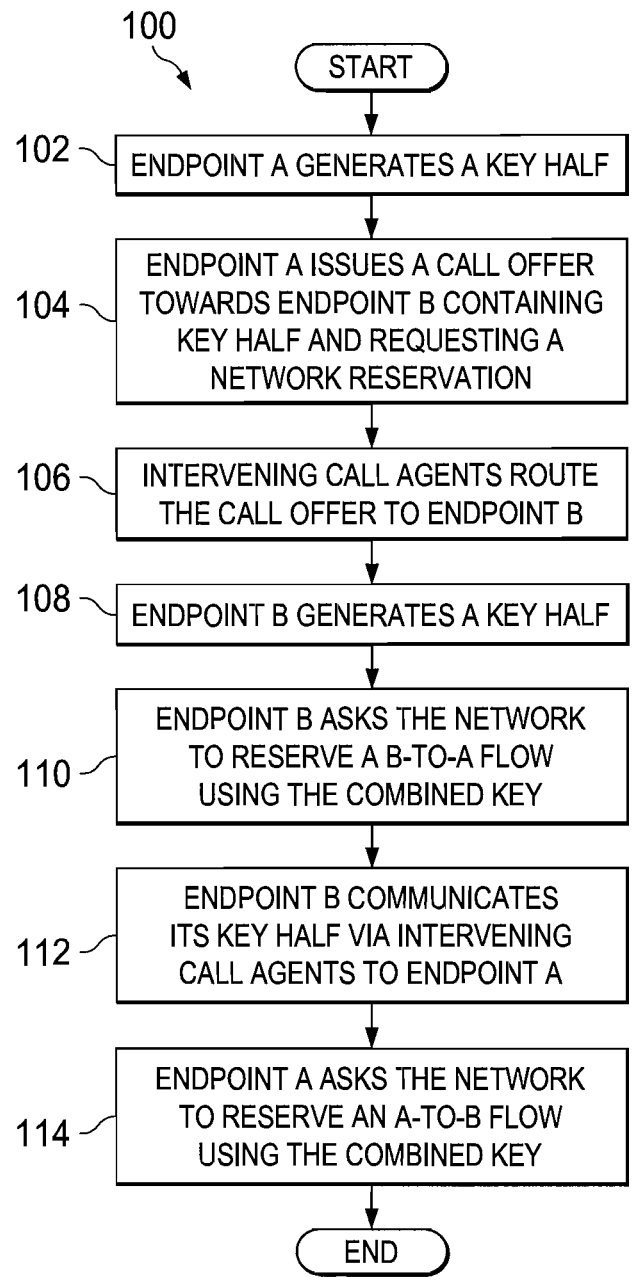
FIGS. 15-19 are simplified flowcharts illustrating example activities associated with certain embodiments of the present disclosure.

FIG. 15 is a simplified flowchart 100 illustrating example steps associated with a point-to-point call being established. In this particular instance, the key is generated by a given endpoint, which also requests the appropriate reservation. The flow may begin at 102, where endpoint A generates a key half. At step 104, endpoint A can issue a call offer toward endpoint B, where this request can contain its associated key half. Additionally, this communication can involve requesting an appropriate network reservation. At step 106, intervening call agents can route the call offer to endpoint B. At step 108, endpoint B can generate its own key half. At step 110, endpoint B can request the network to reserve an endpoint B-to-endpoint A flow using the combined key. At step 112, endpoint B communicates its key half (e.g., via intervening call agents) to endpoint A. At step 114, endpoint A can request the network to reserve an endpoint A-to-endpoint B flow using the combined key.

Figure 16:
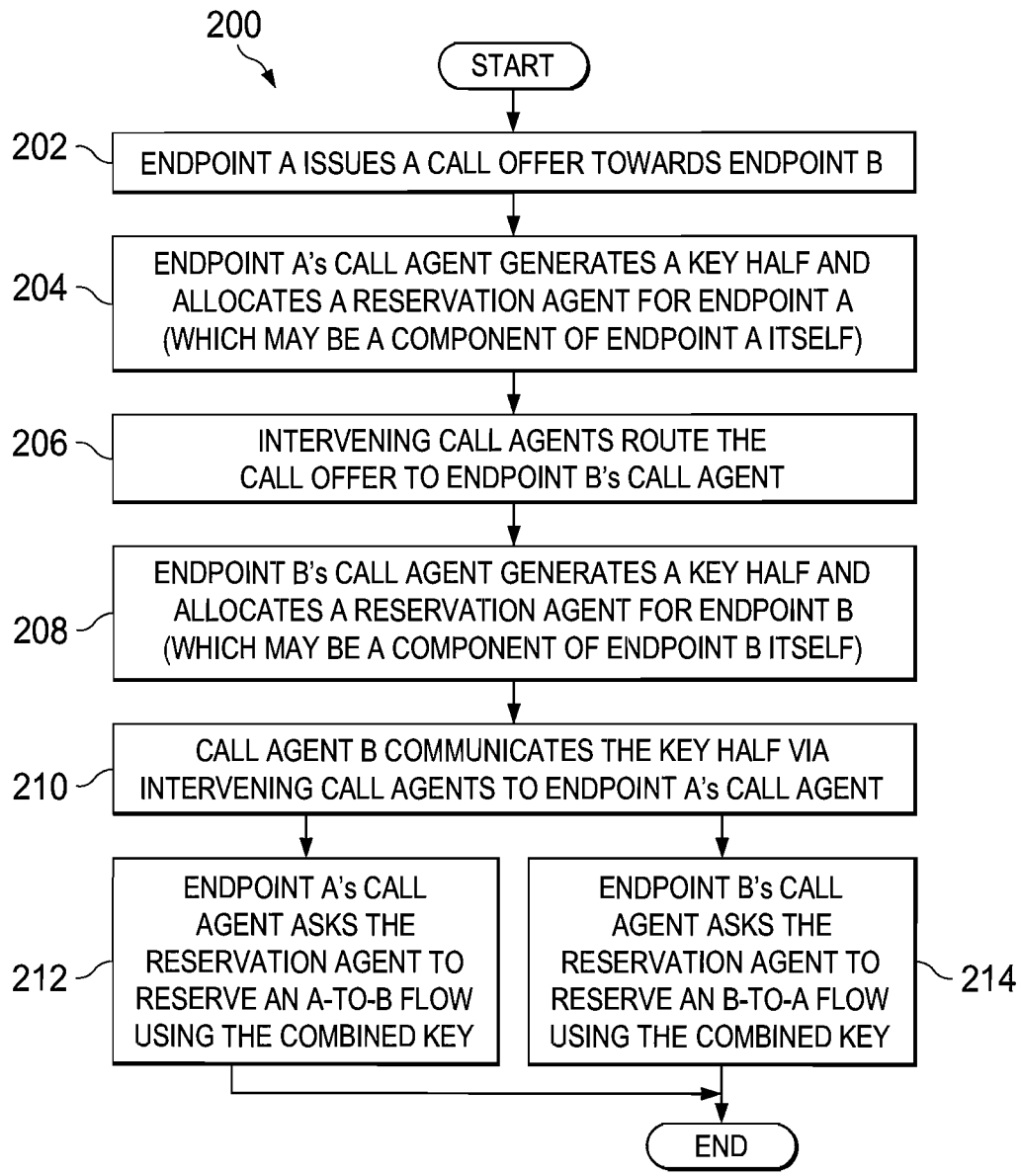

FIG. 16 is a simplified flowchart 200 illustrating an example associated with a point-to-point call. In this particular example, the call agent generates the appropriate key and, further, the call agent generates the appropriate reservation. This particular flow may begin at step 202, where an endpoint A can issue a call offer toward endpoint B. At step 204, the call agent associated with endpoint A is configured to generate a key half. Additionally, the call agent can allocate a reservation agent for endpoint A, which in certain instances may be a component of endpoint A itself. At step 206, the intervening call agent routes the call offer to a call agent associated with endpoint B. At step 208, the call agent for endpoint B can generate a key half. This particular call agent can also allocate a reservation agent for endpoint B, which may be a component of endpoint B itself (in particular examples of the present disclosure). At step 210, the call agent associated with endpoint B can communicate the key half via intervening call agents such that the call agent associated with endpoint A can receive this information. At step 212, the call agent for endpoint A can request the reservation agent to reserve an endpoint A-to-endpoint B flow using the combined key. Additionally, and as reflected by step 214, the call agent associated with endpoint B can request the reservation agent to reserve an endpoint B-to-endpoint A flow using the combined key.

Figure 17:
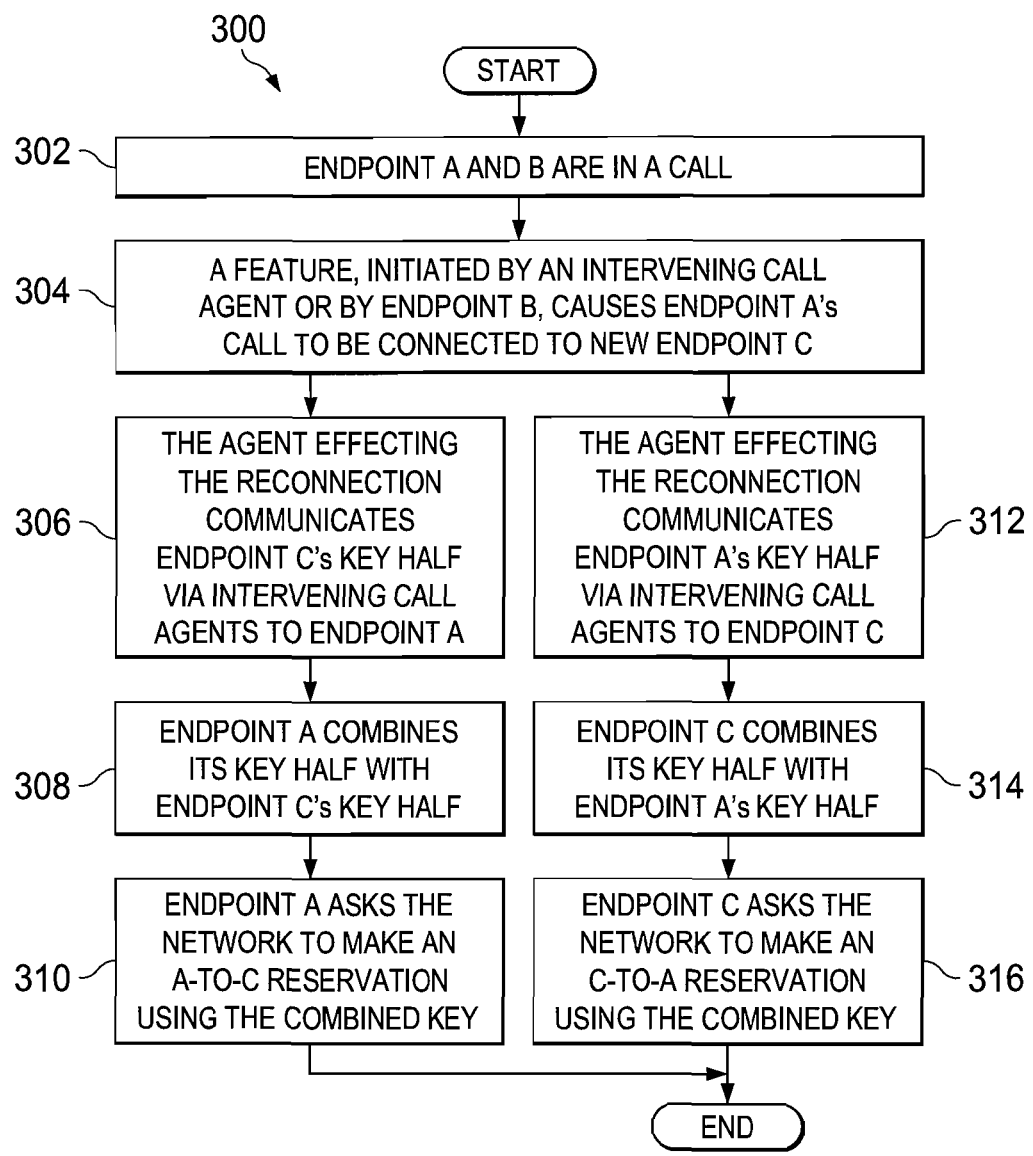

FIG. 17 is simplified flowchart 300 illustrating a mid-call feature operation that results in a new combined key. Note also that in this particular flow, the endpoint can be the mechanism that requests the appropriate reservation for the call. The flow may begin at step 302, where endpoint A and endpoint B are involved in a current call. At step 304, a given feature (e.g., initiated by an intervening call agent, or by endpoint B) can cause endpoint A's call to be connected to a new endpoint C.

Note that steps 312-316 can be performed in a parallel fashion with respect to steps 306-310. Beginning with step 306, the appropriate agent (which may be managing the reconnection) can communicate endpoint C's key half via intervening call agents to endpoint A. At step 308, endpoint A can combined its key half with endpoint C's key half. At step 310, endpoint A can request the network to make an endpoint A-to-endpoint C reservation using the combined key. At step 312, the appropriate agent (handling the reconnection) can communicate endpoint A's key half via intervening call agents to endpoint C. At step 314, endpoint C can combine its key half with endpoint A's key half. At step 316, endpoint C can request the network to make an endpoint C-to-endpoint A reservation using the combined key.

Figure 18:
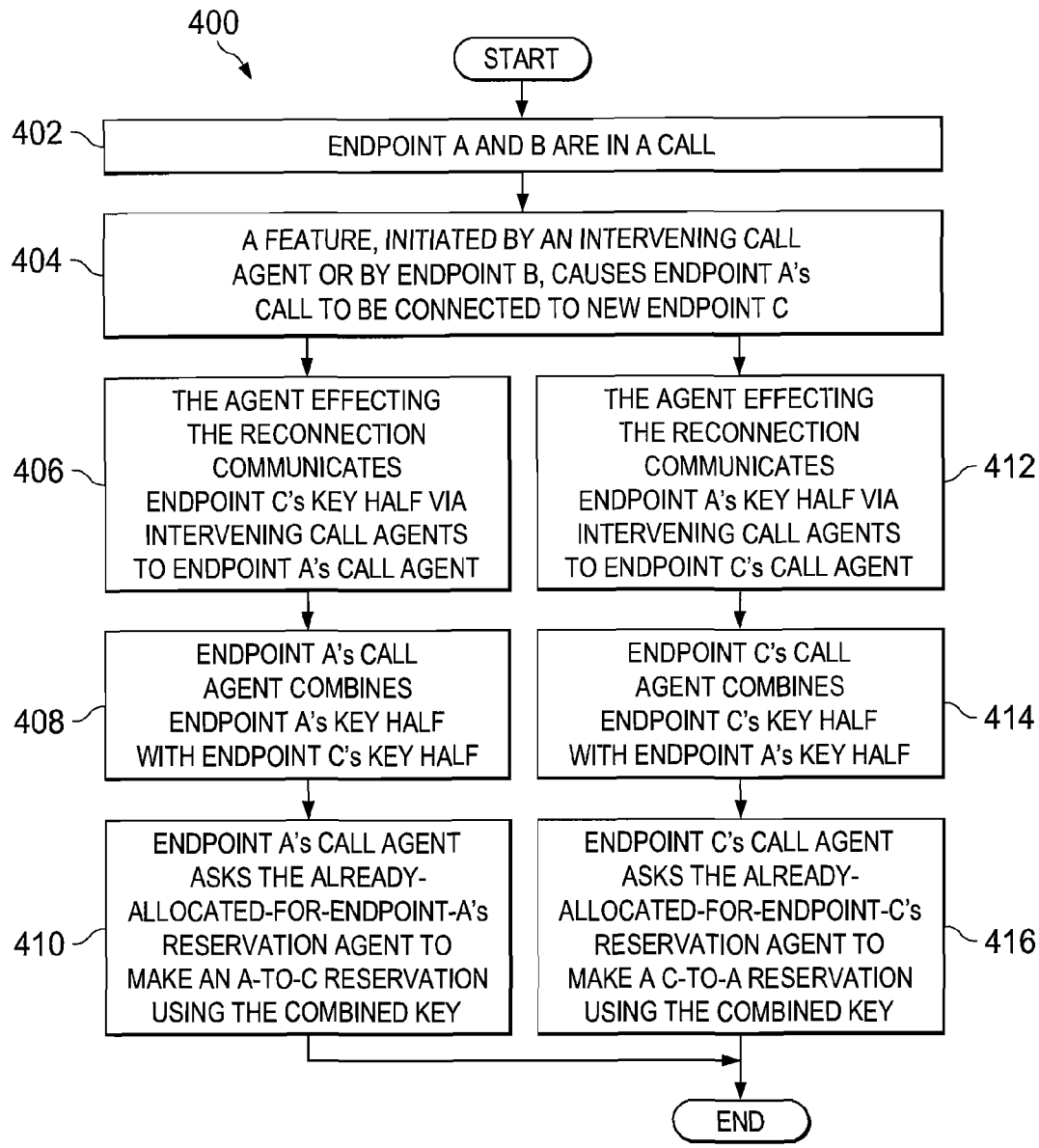

Turning to FIG. 18, FIG. 18 is a simplified flowchart 400 associated with a mid-call feature. The particular mid-call feature can result in a new combined key, where the requested reservation can be made by a call agent. The flow can begin at step 402, where endpoint A and endpoint B are involved in a call. At step 404, a feature (e.g., initiated by an intervening call agent, or by endpoint B) can cause endpoint A's call to be connected to a new endpoint C. Note that steps 412-416 can be performed in a parallel fashion with respect to steps 406-410. Beginning with step 406, the agent effecting the reconnection can communicate endpoint C's key half via intervening call agents, where it would propagate to endpoint A's call agent. At step 408, endpoint A's call agent can combine endpoint A's key half with endpoint C's key half. At step 410, endpoint A's call agent can request (the already-allocated for) endpoint A's reservation agent to make an endpoint A-to-endpoint C reservation using the combined key. At step 412, the agent managing the reconnection can communicate endpoint A's key half via intervening call agents, where it would propagate to endpoint C's call agent. At step 414, endpoint C's call agent can combine endpoint C's key half with endpoint A's key half. At step 416, endpoint C's call agent requests (the already allocated for) endpoint C's reservation agent to make an endpoint C-to-endpoint A reservation using the combined key.

Figure 19:
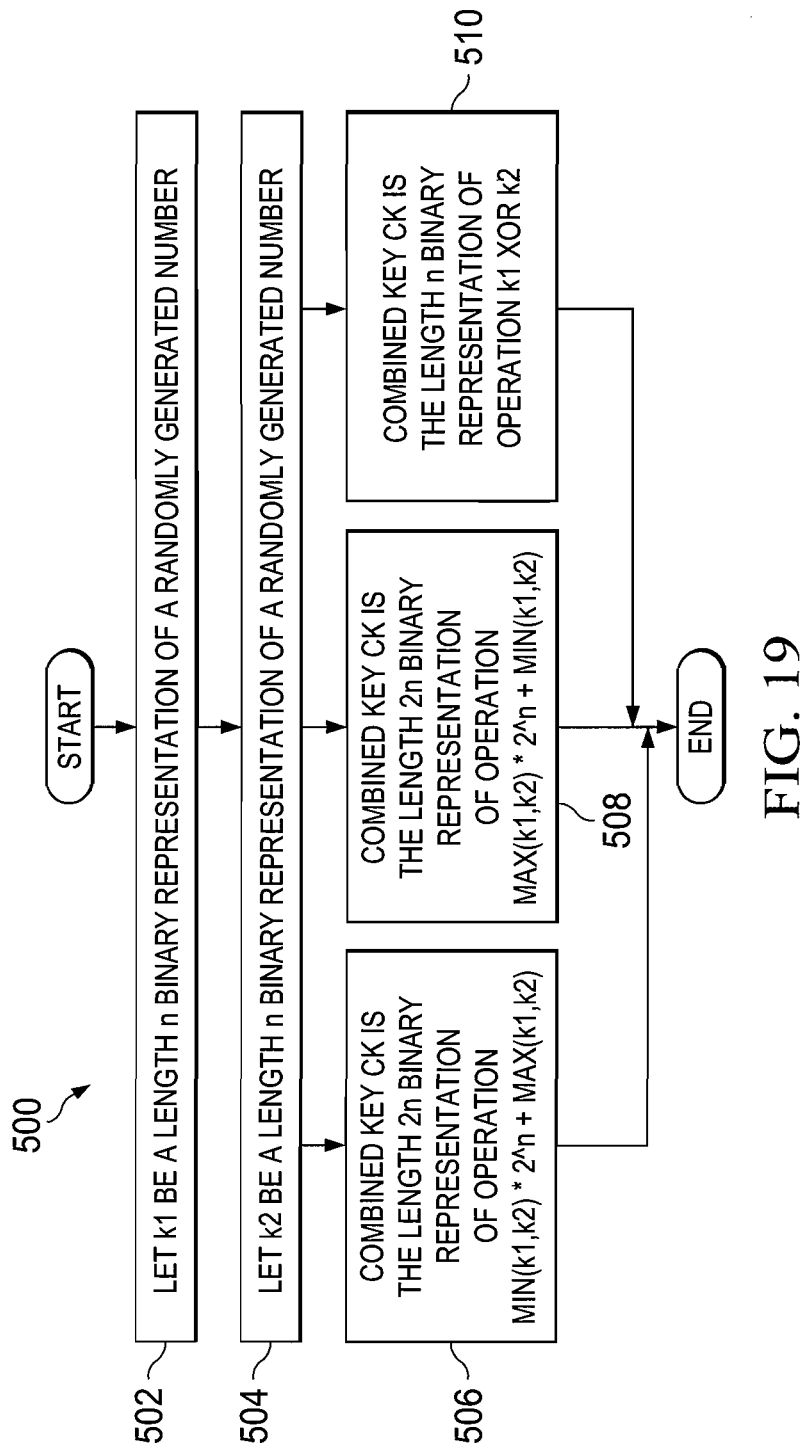

FIG. 19 is a simplified flowchart 500 illustrating possible key combination algorithms that may be used in conjunction with communication system 10. For example, the algorithms may be employed by RSVP servers 46a-c and/or RSVP proxies 22a-d. At step 502, k1 can be used to represent a length 'n' (i.e., a binary representation) of a randomly generated number. Subsequently, at step 504, k2 can be used as a length 'n' of a randomly generated number. Step 506 reflects a combined key (CK) being the length $2n$ of the binary operation: $\min(k1,k2)*2^n+\max(k1,k2)$. Additionally, step 508 represents the combined CK being the length $2n$ of the binary operation: $\max(k1,k2)*2^n+\min(k1,k2)$. Step 510 reflects the combined key CK being a length n, representative of a binary representation of the operation: k1 XOR k2. Note that these potential algorithms can be varied considerably without departing from the teachings of the present disclosure. FIG. 19 simply offers example strategies, equations, and mechanisms that can be effectively employed in fate sharing scenarios detailed herein.

Figure 20:
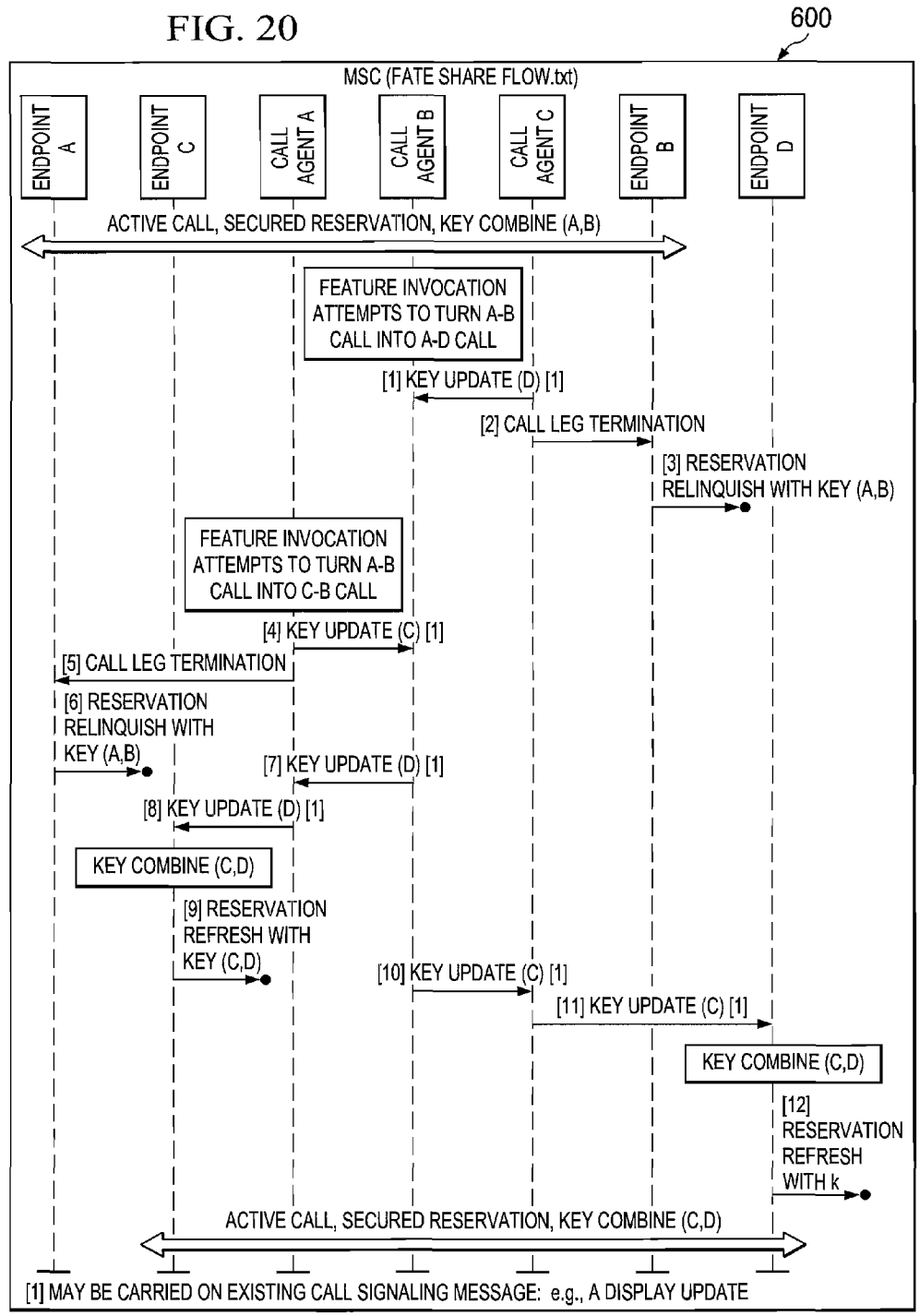
FIG. 20 is a simplified flow diagram illustrating one potential operation associated with the communication system of the present disclosure.

FIG. 20 is a simplified flow diagram 600 illustrating an example chronology associated with certain teachings of the present disclosure. The interaction of FIG. 20 involves endpoints A, B, C, and D, along with corresponding call agents A, B, and C. The flow may begin where there is an active call between endpoint A and endpoint B. Subsequently, a feature invocation attempts to turn the call (initially involving endpoint A and endpoint B) into a call involving endpoint A and endpoint D. In step one, a key update is exchanged between call agent C and call agent B. At step two, a call leg termination message is sent to endpoint B. Note that there is a bracketed one (i.e., [1]) next to certain steps in FIG. 20, and this is indicative of such signaling being carried on existing call signaling messages (e.g., on a display update).

At step three, there is a reservation relinquish message for the key associated with endpoints A and B. Subsequently, feature invocation attempts to turn the call (involving endpoints A and B) into a call involving endpoints C and B. At step four, a key update is sent to call agent B. At step five, there is a call leg termination message sent to endpoint A. The reservation is relinquished for the key associated with endpoints A and B, and this activity is shown as step six. At step seven, there is a key update sent by call agent B to call agent A. At step eight, the key update for endpoint D is sent to endpoint C. At step nine, a reservation refresh message is sent from endpoint C, where this message involves the key associated with endpoints C and D. A key update is then sent from call agent B to call agent C, as is being shown in step ten. At step eleven, the key update for endpoint C is sent to endpoint D. A key combine operation is subsequently executed for endpoints C and D. At step twelve, endpoint D can send a reservation refresh (with the k value) to any suitable next destination. The final result is an active call involving endpoint C and endpoint D, where the call has a secured reservation and an effective fate sharing key associated with endpoints C and D.

Note that in certain example embodiments, the fate sharing ID functions described above may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1] can store data used for the operations described herein. This includes the memory element being able to store software, logic, code, or processor instructions that are executed to carry out the activities described above. A processor can execute any type of instructions associated with the data to achieve the operations detailed above. In one example, the processor [as shown in FIG. 1] could transform an element or an article (e.g., data) from one state or thing to another state or thing. In another example, the activities described herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the FIGURES illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings provided herein.

Although the present disclosure has been described in detail with reference to particular embodiments, it should be understood that various other changes, substitutions, and alterations may be made hereto without departing from the spirit and scope of the present disclosure. For example, although the previous discussions have detailed VoIP communications or certain SIP applications, other applications and protocols could readily adopt the teachings of the present disclosure. The present disclosure can be used in a host of applications and, further, be equally applicable to other communication scenarios in which endpoint fate sharing IDs have a propensity to become inconsistent. Additionally, it should be noted that the fate sharing ID activities discussed herein are not restricted to scenarios associated with feature invocation. For example, the fate sharing ID coordination (involving two key halves) discussed herein could be used as a default in certain network provisioning.

Moreover, although previous examples have focused on RSVP being used in certain embodiments, it is worth specifically mentioning off-path mechanisms, which currently predominate certain industries and which could readily adopt the teachings of the present disclosure. A fate-sharing ID is readily applicable, and useful in those scenarios. For example, assume that when Alice and Bob call each other, they each have a local CAC store that is tracking bandwidth in and out of their respective locations. A network event may cause the available bandwidth at, for example, Bob's location to drop precipitously. If the CAC store has methods for pre-empting calls, or for down-speeding them, a fate sharing ID in that local store can allow the CAC store to pre-empt full sessions instead of individual flows. With such a local CAC store, there is no end-to-end PATH/RESV/RESV-CONF flow for any flow, but just local communication and tracking.

In a general sense, the fundamental network elements for the fate sharing mechanism to be useful and operational would include an end-to-end or local CAC mechanism capable of terminating or modifying sessions in response to network events and capable of associating a fate sharing ID with flows; 2) multi-flow sessions; 3) key halves and key-half composition logic; and 4) a network of call agents that maintains leg-specific, static identifiers and that issues end-to-end signaling refreshes when session events cause two new parties to be connected.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving a first portion of an identifier associated with a communication session involving a first endpoint that generated the first portion of the identifier;
    receiving a second portion of the identifier associated with the communication session involving a second endpoint that generated the second portion of the identifier, the communication session comprising a plurality of data flows including at least a first data flow originating at the first endpoint and a corresponding second data flow originating at the second endpoint;
    communicating a reservation request associated with a network resource to be allocated for the communication session, wherein the reservation request includes the first portion and the second portion of the identifier, wherein the first portion of the identifier combined with the second portion of the identifier form a combined identifier that uniquely identifies the plurality of data flows of the communication session between the first and second endpoints; and
    in response to the first data flow being purged, purging the corresponding second data flow based on the combined identifier, such that purging of the first data flow causes purging of at least one other data flow in a same communication session without causing purging of data flows in other communication sessions,
    wherein a transfer feature invocation by the first endpoint causes the first portion of the identifier to be changed to reflect a third endpoint being associated with the communication session.

2. The method of claim 1, further comprising:
    communicating a call offer toward the second endpoint, wherein the first and second endpoints are configured to exchange packets after the communication session is established.

3. The method of claim 1, wherein a feature operation by the first endpoint results in a connected party update for both endpoints, and wherein at a subsequent reservation refresh, the combined identifier is updated.

4. The method of claim 1, wherein the first portion and the second portion are processed via a concatenation operation, or via an XOR operation in order to generate the reservation request for the network resource.

5. The method of claim 1, wherein the reservation request is a Resource Reservation Protocol (RSVP) reserve message for the network resource, and wherein the communication session is a voice over Internet protocol (VoIP) session involving a session initiation protocol (SIP).

6. The method of claim 1, wherein the first portion of the identifier and the second portion of the identifier are exchanged via call signaling between call agents associated with the first and second endpoints involved in the communication session.

7. Logic encoded in one or more non-transitory tangible media that includes code for execution and when executed by a processor operable to perform operations comprising:
    receiving a first portion of an identifier associated with a communication session involving a first endpoint that generated the first portion of the identifier;
    receiving a second portion of the identifier associated with the communication session involving a second endpoint that generated the second portion of the identifier, the communication session comprising a plurality of data flows including at least a first data flow originating at the first endpoint and a corresponding second data flow originating at the second endpoint;

communicating a reservation request associated with a network resource to be allocated for the communication session, wherein the reservation request includes the first portion and the second portion of the identifier, wherein the first portion of the identifier combined with the second portion of the identifier form a combined identifier that uniquely identifies the plurality of data flows of the communication session between the first and second endpoints; and in response to the first data flow being purged, purging the corresponding second data flow based on the combined identifier, such that purging of the first data flow causes purging of at least one other data flow in a same communication session without causing purging of data flows in other communication sessions, wherein a transfer feature invocation by the first endpoint causes the first portion of the identifier to be changed to reflect a third endpoint being associated with the communication session.

8. The logic of claim 7, the operations further comprising:
communicating a call offer toward the second endpoint, wherein the first and second endpoints are configured to exchange packets after the communication session is established.

9. The logic of claim 7, wherein a feature operation by the first endpoint results in a connected party update for both endpoints, and wherein at a subsequent reservation refresh, the combined identifier is updated.

10. The logic of claim 7, wherein the first portion and the second portion are processed via a concatenation operation, or via an XOR operation in order to generate the reservation request for the network resource.

11. The logic of claim 7, wherein the reservation request is a Resource Reservation Protocol (RSVP) reserve message for the network resource, and wherein the communication session is a voice over Internet protocol (VoIP) session involving a session initiation protocol (SIP).

12. The logic of claim 7, wherein the first portion of the identifier and the second portion of the identifier are exchanged via call signaling between call agents associated with the first and second endpoints involved in the communication session.

13. An apparatus, comprising:
a memory element configured to store code;
a processor operable to execute instructions associated with the code; and
a resource reservation protocol server or proxy configured to interface with the memory element and the processor such that the apparatus configured to:

receive a first portion of an identifier associated with a communication session involving a first endpoint that generated the first portion of the identifier;

receive a second portion of the identifier associated with the communication session involving a second endpoint that generated the second portion of the identifier, the communication session comprising a plurality of data flows including at least a first data flow originating at the first endpoint and a corresponding second data flow originating at the second endpoint; and communicate a reservation request associated with a network resource to be allocated for the communication session, wherein the reservation request includes the first portion and the second portion of the identifier, wherein the first portion of the identifier combined with the second portion of the identifier form a combined identifier that uniquely identifies the plurality of data flows of the communication session between the first and second endpoints; and in response to the first data flow being purged, purging the corresponding second data flow based on the combined identifier, such that purging of the first data flow causes purging of at least one other data flow in a same communication session without causing purging of data flows in other communication sessions, wherein a transfer feature invocation by the first endpoint causes the first portion of the identifier to be changed to reflect a third endpoint being associated with the communication session.

14. The apparatus of claim 13, wherein a feature operation by the first endpoint results in a connected party update for both endpoints, and wherein at a subsequent reservation refresh, the combined identifier is updated.

15. The apparatus of claim 13, wherein the first portion and the second portion are processed via a concatenation operation, or via an XOR operation in order to generate the reservation request for the network resource.

16. The apparatus of claim 13, wherein the reservation request is a Resource Reservation Protocol (RSVP) reserve message for the network resource, and wherein the communication session is a voice over Internet protocol (VoIP) session involving a session initiation protocol (SIP).

17. The apparatus of claim 13, wherein the first portion of the identifier and the second portion of the identifier are exchanged via call signaling between call agents associated with the first and second endpoints involved in the communication session.

* * * * *